US009748882B1

(12) United States Patent
Breheny et al.

(10) Patent No.: US 9,748,882 B1
(45) Date of Patent: Aug. 29, 2017

(54) INTEGRATED MOTOR DRIVER/CONTROLLER WITH SENSORLESS OR SENSORED COMMUTATION

(71) Applicant: Amazon Technologies, Inc., Seattle, WA (US)

(72) Inventors: Sean Hugh Breheny, Watertown, MA (US); Shaun Steven Hayward, Waltham, MA (US); Kevin John Trenholme, Stow, MA (US); Sean Garcen, Hudson, MA (US); William Joseph Sullivan, Dunstable, MA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/082,534

(22) Filed: Mar. 28, 2016

(51) Int. Cl.
| H02P 1/54 | (2006.01) |
| H02P 21/06 | (2016.01) |
| H02P 3/06 | (2006.01) |
| H02P 6/08 | (2016.01) |
| H02P 6/185 | (2016.01) |
| B65G 1/04 | (2006.01) |

(52) U.S. Cl.
CPC ............ *H02P 21/06* (2013.01); *B65G 1/0492* (2013.01); *H02P 3/06* (2013.01); *H02P 6/08* (2013.01); *H02P 6/185* (2013.01)

(58) Field of Classification Search
CPC .... H02P 21/06; H02P 3/06; H02P 6/08; H02P 6/185; B65G 1/0492
USPC ......................................................... 318/34
See application file for complete search history.

(56) References Cited

U.S. PATENT DOCUMENTS

| 4,773,025 A | * | 9/1988 | Penkar | G05B 19/416 318/568.2 |
| 4,829,219 A | * | 5/1989 | Penkar | G05B 19/416 318/568.18 |
| 4,864,206 A | * | 9/1989 | Onaga | G05B 19/4062 318/568.11 |
| 4,894,598 A | * | 1/1990 | Daggett | B25J 13/088 318/563 |
| 4,962,338 A | * | 10/1990 | Daggett | G05B 19/4141 318/568.11 |
| 5,115,174 A | * | 5/1992 | Masuda | G11B 19/20 318/400.03 |
| 5,187,417 A | * | 2/1993 | Minnich | H02P 6/06 318/400.12 |

(Continued)

OTHER PUBLICATIONS

PCT/US2017/021394 , "International Search Report and Written Opinion", dated Jun. 2, 2017, 14 pages.

(Continued)

*Primary Examiner* — Rita Leykin
(74) *Attorney, Agent, or Firm* — Kilpatrick Townsend & Stockton LLP

(57) ABSTRACT

A motor controller configured to control different types of electronically commutated motors (ECMs) includes a range of different rotor orientation signal inputs to accommodate differences between ECM motor types. The motor controller includes a control unit that receives motor operation commands and controls operation of the ECM in accordance with the motor operation commands. The control unit receives and stores data designating ECM type and estimates rotor position based on the designated ECM type.

20 Claims, 19 Drawing Sheets

(56) References Cited

U.S. PATENT DOCUMENTS

| | | | | |
|---|---|---|---|---|
| 5,355,062 A | * | 10/1994 | Takizawa | B65G 43/08 318/568.1 |
| 5,444,341 A | * | 8/1995 | Kneifel, II | H02P 6/10 318/400.41 |
| 5,486,747 A | | 1/1996 | Welch | |
| 5,642,024 A | * | 6/1997 | Okada | G05B 19/416 318/568.1 |
| 6,470,225 B1 | * | 10/2002 | Yutkowitz | G05B 11/28 700/188 |
| 6,784,634 B2 | * | 8/2004 | Sweo | H02P 9/007 290/46 |
| 7,072,740 B2 | * | 7/2006 | Iribe | G06N 3/008 180/8.1 |
| 7,168,748 B2 | * | 1/2007 | Townsend | B25J 9/1612 294/106 |
| 7,366,587 B2 | * | 4/2008 | Iribe | B62D 57/032 180/8.1 |
| 7,511,443 B2 | | 3/2009 | Townsend et al. | |
| 7,583,039 B2 | * | 9/2009 | Zhong | H02P 6/181 318/400.07 |
| 7,816,881 B2 | * | 10/2010 | Wiegers | H02P 6/16 318/560 |
| 7,893,644 B2 | | 2/2011 | Townsend et al. | |
| 7,999,496 B2 | * | 8/2011 | Gleason | H02P 21/18 318/139 |
| 8,280,547 B2 | | 10/2012 | D'Andrea et al. | |
| 8,410,737 B2 | * | 4/2013 | Wu | H02P 21/0025 180/65.265 |
| 8,796,983 B2 | * | 8/2014 | Wu | H02P 6/20 318/400.04 |
| 9,041,330 B2 | * | 5/2015 | Voillat | H02P 6/182 318/400.01 |
| 9,071,186 B2 | * | 6/2015 | Wu | H02P 27/08 |
| 9,087,314 B2 | | 7/2015 | Hoffman et al. | |
| 9,187,244 B2 | * | 11/2015 | Toebes | B65G 1/0492 |
| 9,270,223 B2 | * | 2/2016 | Wu | H02P 27/08 |
| 9,321,591 B2 | * | 4/2016 | Lert | B65G 1/0492 |
| 9,423,796 B2 | * | 8/2016 | Sullivan | G05D 1/0272 |
| 9,442,029 B2 | * | 9/2016 | Wu | G01L 3/26 |
| 9,481,466 B2 | * | 11/2016 | Fischer | B64D 11/0639 |
| 2004/0100221 A1 | | 5/2004 | Fu et al. | |
| 2005/0047895 A1 | * | 3/2005 | Lert | B65G 1/0492 414/273 |
| 2006/0100723 A1 | * | 5/2006 | Sun | G05B 19/4141 700/61 |
| 2015/0311833 A1 | | 10/2015 | Bai et al. | |
| 2016/0276962 A1 | * | 9/2016 | Khalil | H02P 21/22 |
| 2016/0276971 A1 | * | 9/2016 | Thyagarajan | H02P 23/30 |

OTHER PUBLICATIONS

Goll et al., "Optionally filling scalable complex of universal DC motor controllers and multisensory converters for mobile robotics", 2015 IEEE International Conference on Industrial Technology (ICIT). IEEE, (Mar. 17, 2015), pp. 392-398.

\* cited by examiner

INTEGRATED MOTOR DRIVER/CONTROLLER WITH SENSORLESS OR SENSORED COMMUTATION

BACKGROUND

Electronically commutated motors (ECMs) are driven via controlled application of drive currents to stator coils to controllably rotate a rotor. In many ECMs, the rotor includes one or more permanent magnets that interact with the magnetic field generated via the stator coils. In many ECMs, the drive currents applied to the stator coils are generated via a switching assembly that is controlled via a control unit to controllably connect and disconnect the stator coils to a DC voltage and an electrical ground.

The control unit controls the switching assembly based at least in part on a rotor orientation estimate. The rotor orientation estimate is used to ensure that the switching assembly is controlled so that the stator coils produce magnetic fields suitable to produce a desired torque on the rotor. Many different approaches for estimating rotor orientation exist.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

In many embodiments, a motor controller is configured to control any designated one of a plurality of different types of electronically commutated motors (ECMs). The motor controller can be configured to be attached to the ECM controlled by the motor controller. In many embodiments, the motor controller includes a controller area network bus (CANBUS) interface over which the motor controller can receive motor drive commands that cause the motor controller to control currents supplied to stator coils of the ECM to control operation of the ECM in accordance with the motor commands. In many embodiments, the motor controller is configured to accept DQ-frame current commands via the CANBUS interface and perform field-oriented control of the ECM. In many embodiments, the motor controller includes rotor orientation signal inputs (e.g., Hall effect sensor inputs, incremental encoder inputs) that accommodate a wide variety of different ECM types with respect to signals indicative of rotor orientation generated by the different ECM types. In many embodiments, the motor controller can accomplish sensorless rotor angle determination by measurement of inductive properties of the motor as well as measurement of the back-EMF waveforms. In many embodiments, the motor controller is configured to test itself as well as test the ECM. In many embodiments, the motor controller is configured to transmit all the sensor information to an upper-level controller via the CANBUS interface. In many embodiments, the motor controller is configured to communicate with an upper-level controller via the CANBUS interface using a custom communication protocol. In many embodiments, the motor controller is configured to accommodate tuning of the motor controller in response to tuning commands received via the CANBUS interface. In many embodiments, the motor controller is configured to detect when the motor controller is unstable and accomplish a self-protection shutdown of the motor controller.

Figure 1:
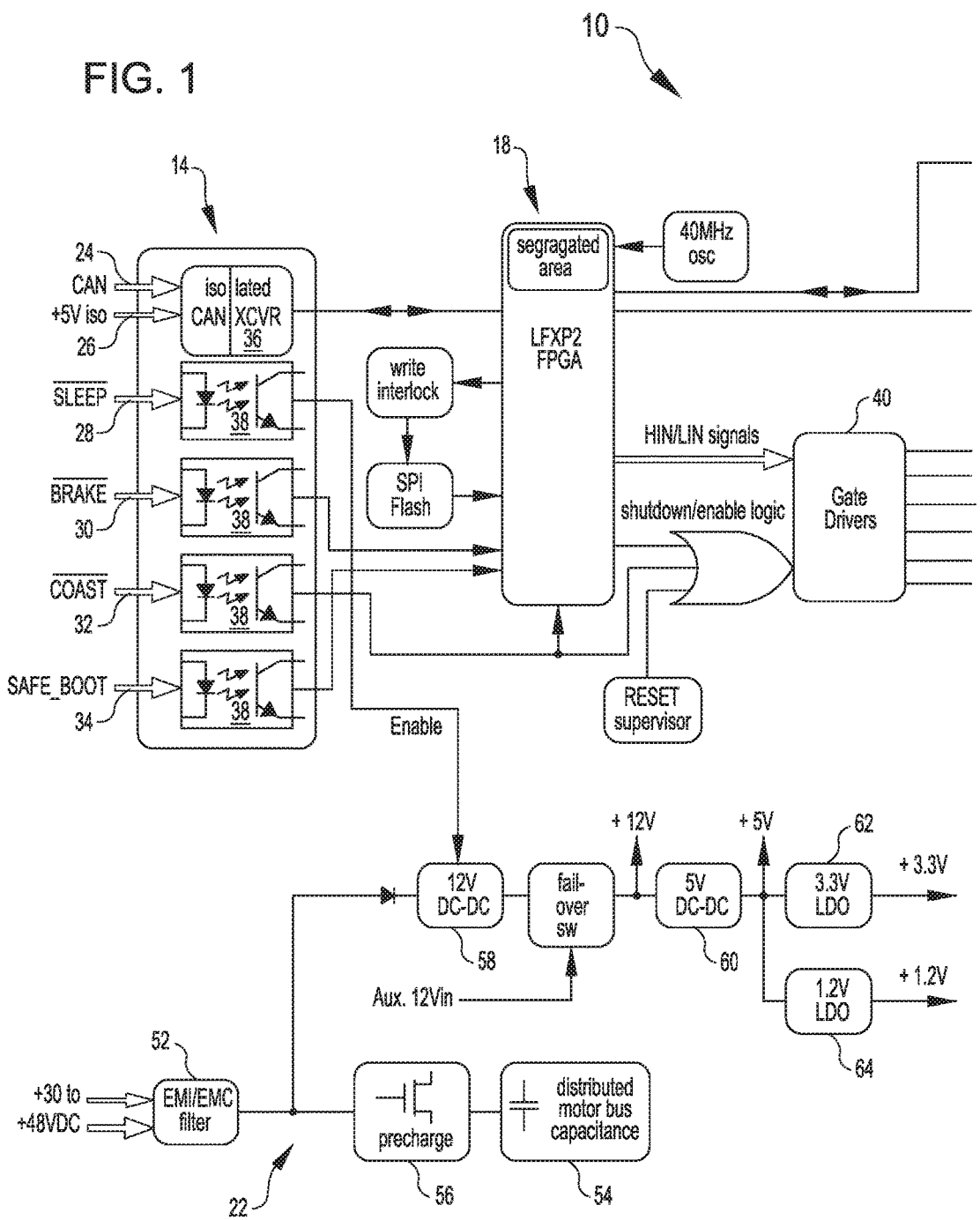
FIG. 1 is a simplified schematic diagram illustrating a motor controller that is configured to control any designated type of electronically commutated motor (ECM) of a plurality of different types of ECMs, can be locally integrated with the ECM and receives motor control commands via a controller area network (CAN), in accordance with many embodiments.
Figure 1:
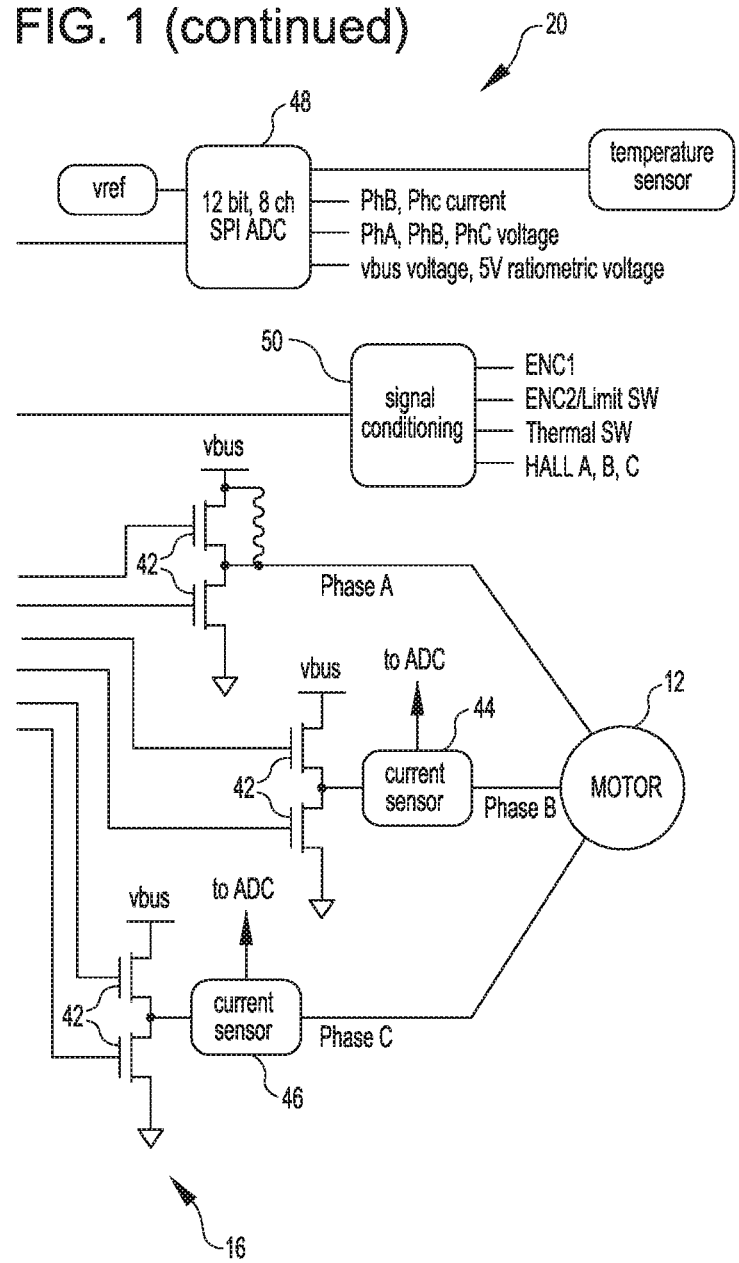

Referring now to the drawings in which like reference numbers refer to like elements in the various figures, FIG. 1 schematically illustrates a motor controller 10 shown operatively connected to motor stator coils of an ECM motor 12, in accordance with many embodiments. The motor controller 10 includes an input isolation assembly 14, a switching assembly 16, a control unit 18, a feedback assembly 20, and an input voltage assembly 22. As described herein, the motor controller 10 is configured to control any designated type of ECM from a plurality of different types of ECMs with respect to the signals generated by the ECM 12 used by the motor controller 10 to estimate rotor orientation used to commutate the ECM 12.

The input isolation assembly 14 includes a CANBUS input 24, a +5V ISO input 26, a SLEEP signal input 28, a BRAKE signal input 30, a COAST signal input 32, and a SAFE BOOT signal input 34. The input isolation assembly 14 includes an isolated CAN transmitter/receiver 36 that operatively connects the CANBUS input 24 with the control unit 18. Power for the isolated (external) side of the CAN transceiver/receiver 36 is externally provided via the +5V ISO input 26. The isolated CAN transmitter/receiver 36 is configured to inhibit transmission of noise to the control unit 18 from the CANBUS input 24 and from the control unit 18 to the CANBUS input 24. The input isolation assembly 14 also includes optical isolation assemblies 38 that are configured to inhibit transmission of noise to and from the sleep signal input 28, the brake signal input 30, the coast signal input 32, and the safe boot signal input 34. As described in more detail below, in many embodiments, the motor controller 10 is controlled via the input isolation assembly 14 via commands received via the CANBUS input 24 that are part of a communication protocol that is invariant regardless of the type of ECM motor 12 being controlled.

In addition to motor control commands received via the CANBUS input 24, the motor controller 10 is responsive to additional direct control signals received via the sleep signal input 28, the brake signal input 30, the coast signal input 32, and the safe boot signal input 34. In many embodiments, these other input signals are active low so that disconnection has the same result as pulling them low. In many embodiments, the SLEEP signal has priority over the COAST signal, which in turn has priority over the BRAKE signal, which finally has priority over the CAN bus commands. In many embodiments, these other input signals can be driven by an approximately 5V signal capable of at least 5 mA drive.

The SLEEP signal provides a soft power-off control for the motor controller 10 by controlling supply of operational power to the motor controller 10, as well as a means for forcing a power-cycle reset of the control unit 18. The SLEEP signal can be cycled after an update the firmware of the motor controller 10 to force the control unit 18 to load the new firmware.

When the SLEEP signal is asserted (which is either by pulling it LOW or disconnecting it), the motor controller 10 can be configured to enter a full power-down mode within less than a suitable time span (e.g., less than 100 milliseconds). When SLEEP signal is de-asserted (pulled HIGH), it may take a longer time span (e.g., up to 1 second) for the motor controller 10 to be fully awake and ready to drive the ECM 12. The longer awakening time span can occur because the input voltage assembly 22 contains a chain of power supplies that need to start-up and stabilize, the control unit 18 needs to load its entire bitstream from external flash, and the sequential delay of two reset supervisors needs to expire.

In SLEEP mode, the ECM is allowed to freewheel (all field effect transistors (FETs) in the switching assembly 16 are off). The only exception to this is if the battery + and − lines going to motor controller 10 are externally shorted together, in which case the motor controller 10 may not be able to prevent motor braking due to FET body diode conduction.

When the COAST signal is asserted (either by pulling it LOW or disconnecting it), the control unit 18 controls the switching assembly 16 to turn all six FETs off. In addition, the switching assembly 16 includes three gate driver ICs that are put into a shutdown mode in response to the COAST signal being asserted. If the COAST signal is de-asserted (pulled HIGH), then the control unit 18 can be configured to remain in a latched coasting (freewheeling) condition until it is reset by the SLEEP signal. The backup COAST path in pure hardware, however, will no longer be active.

When the BRAKE signal is asserted (either by pulling it LOW or disconnecting it), the motor controller 10 performs a braking algorithm for a suitable time span (e.g., 3 seconds), followed by shorting the motor continuously by means of turning all three low-side FETs on. The braking algorithm is intended to bring the ECM 12 to a controlled stop. The continuous shorting after 3 seconds is intended to prevent rotation of the ECM 12 after stopping. The control unit 18 latches the braking condition until the control unit 18 is reset by cycling the SLEEP signal or until power is lost. Even if battery power is lost, control unit 18 will continue to provide the braking function (algorithm for 3 seconds followed by continuous shorting) for as long as power is supplied via 12 VH and SLEEP is not asserted (i.e., it is not OPEN or LOW). Any suitable braking algorithm can be employed. For example, the control unit 18 can use estimated rotor orientations to determine deceleration of the ECM 12 and control a duty cycle of pulsed low-side FET motor shorting to control deceleration of the ECM 12 to an optimum level. The control unit 18 can also adjust the phase angle of this switching so that the switching-off condition in each phase of the ECM 12 coincides with the current zero-crossing—which would maximize kinetic energy dissipation in the ECM 12 winding resistance and minimize energy transfer from the ECM 12 to the power bus. Alternatively, the control unit 18 can adjust the phase angle to obtain regeneration in order to power itself for as long as possible during braking in a loss-of-power situation.

When the SAFE BOOT signal input 34 is asserted (either by pulling it LOW or disconnecting it), the control unit loads a recovery-mode firm-ware image from memory. Accordingly, the SAFE BOOT signal can be used to reboot the control unit 18 in any suitable situation, such as to recover from a failed update of firm-ware for the control unit 18.

The control unit 18 is also configured to monitor encoder output from the ECM 12 (when the ECM 12 is equipped with an encoder) and perform consistency checks. In many embodiments, if the control unit 18 detects a faulty encoder and braking is commanded, the control unit 18 performs an open-loop motor-shorting duty-cycle profile followed by continuous shorting after 3 seconds. The control unit 18 can also be configured to monitor for some fault conditions that may prevent proper braking (like damaged FETs) and control the ECM 12 to coast instead of braking in response to detecting such conditions.

The switching assembly 16 includes gate drivers 40, six power FETs 42, and current sensors 44, 46. The six power FETs 42 are controlled via the gate drivers 40 to control connection of stator motor coils of the ECM 12 (Phase A coil, Phase B coil and Phase C coil) to bus voltage or ground voltage to control operation of the ECM 12. The current sensors 44, 46 measure current in the Phase B and Phase C coils, respectively. The current in the Phase A coil is computed as the negative of the sum of the Phase B and C coil currents. The gate drivers 40 are controlled by the control unit 18 to supply current to the stator coils of the ECM 12 in accordance with motor drive commands received via the CANBUS and in accordance with the other input signals (i.e., SLEEP signal, BRAKE signal, COAST signal).

The control unit 18 is operatively coupled with the isolated CAN transmitter/receiver 36, the BRAKE signal input 30, the COAST signal input 32, the SAFE BOOT signal input 34, the gate drivers 40 of the switching assembly 16, and the feedback assembly 20. The control unit 18 can include any suitable control electronics (e.g., a suitable field programmable gate array (FPGA)).

The feedback assembly 20 receives analog feedback signals from the switching assembly 16 indicative of current in each of the Phase A and B stator coils, voltage in each of the Phase A, B and C stator coils, as well as the bus voltage and the 5 Volt ratio-metric voltage. The analog feedback signals from the switching assembly 16 are converted via an analog to digital converter 48 to corresponding digital signals supplied to the control unit 18. The feedback assembly 20 is also configured to receive any suitable combination of a range of different signals from the ECM 12 including signals indicative of rotor orientation (e.g., encoder signal(s), hall sensor signals) and a thermal switch signal. The feedback signals from the ECM 12 are processed via signal conditioning 50 and the processed signals are supplied to the control unit 18. The feedback assembly 20 is also configured to transmit and receive thermal switch IN and OUT signals that are used to pass a 1 kHz square wave signal through a thermostat inside the motor stator. If this thermostat opens, the motor controller 10 will stop operation of the ECM 12 and report, via the CANBUS, that the thermal switch has opened.

The input voltage assembly 22 receives a suitable direct current voltage (e.g., a 30 to 48 VDC voltage from a battery) for use in powering the ECM 12 and the motor controller 10. The input voltage assembly 22 includes an EMI/EMC filter 52 to filter the received input voltage and to prevent upstream transmission of noise from the motor controller 10 and the ECM 12. The input voltage assembly 22 includes a distributed motor bus capacitance assembly 54 and a pre-charge assembly 56 that temporarily limits current flow to the distributed motor bus capacitance assembly 54 during initial start-up of the motor controller 10 by temporarily coupling a resistance between the EMI/EMC filter 52 and the distributed motor bus capacitance assembly 54. The input voltage assembly 22 further includes a series of voltage step-down converters including a first voltage step-down converter 58 that receives the 30 to 48 Volt DC input voltage and outputs 12 Volts DC, a second voltage step-down converter 60 that receives 12 Volt DC and outputs 5 Volt DC, a third voltage step-down converter 62 that receives 5 Volt DC and outputs 3.3 Volt DC, and a fourth voltage step-down converter 64 that receives 5 Volt DC and outputs 1.2 Volt DC.

Vector Sine Drive/Field-Oriented Control Engine

The basic technique employed by the control unit 18 to drive the ECM 12 is known by two common names: vector sine drive (VSD) or field-oriented control (FOC). These names reflect the fact that the input command to this control method is a two-element current vector, whose amplitude represents the amplitude of sinusoidal current functions of motor rotor angle, driven into the three phase stator coils of the ECM 12. The three phases are driven with sinusoids that are all mutually 120° out of phase with each other and offset from the rotor angle by a phase offset that depends on the angle of the current vector command.

The local magnetic field vector in the tiny gap between the rotor and stator of the ECM 12, at each point around the circumference of the gap, is a function of the rotor angle as well as the amplitude and direction of the commanded current vector. Considered in Cartesian coordinates, one component of the vector (called the Q-axis) is orthogonal or quadrature (hence Q) to the permanent magnet field in the gap. The other component is parallel or directionally-aligned (hence D) with the permanent magnet field.

The Q component is responsible for most of the torque production (all of the torque production if the rotor of the ECM 12 is radially-symmetrical in the distribution of the magnets, ignoring their polarity, and iron—this is also called "non-salient"). The D component either strengthens or weakens the total magnetic field flux passing through the stator coils, which is responsible for the "back-EMF" portion of the motor terminal voltages. Therefore, the Q component can be used to control torque while the D component can be used to reduce or increase the motor terminal voltage, which is also a function of rotor rotational speed.

Figure 2:
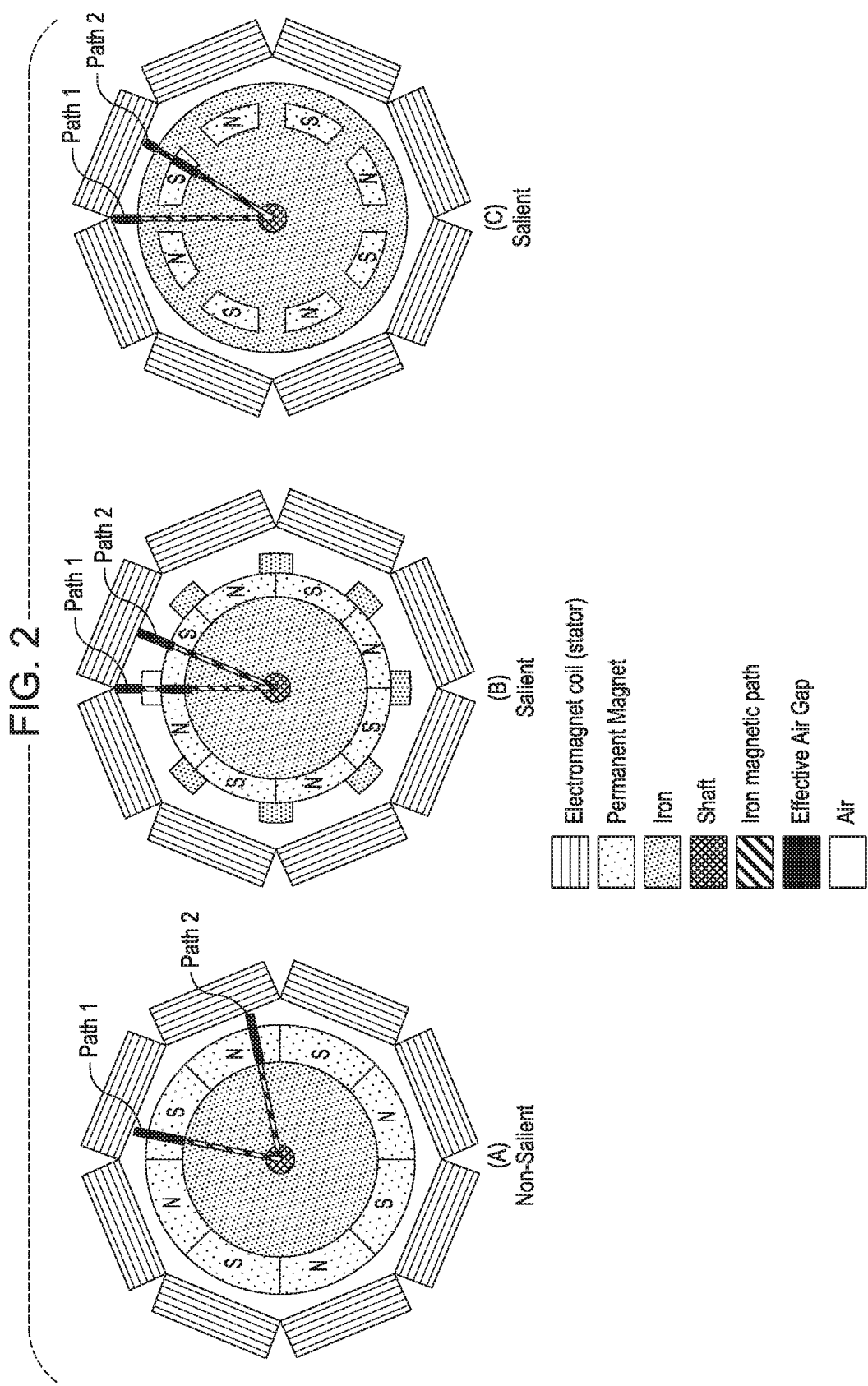
FIG. 2 is a simplified schematic diagram comparing salient and non-salient ECMs.

FIG. 2 is a simplified schematic diagram comparing salient and non-salient ECMs. Saliency consists of a variation in the total magnetic effective air gap along any radial from rotor to stator as the rotor turns. Effective air gap can be either actual air gap or permanent magnet material, which is already saturated and exhibits dB/dH similar to air or a vacuum. If the ECM 12 is "salient" (meaning that a radial line segment from the shaft to the stator passes through a varying proportion of iron or electrical steel versus permanent magnet material or air as the rotor angle changes), then a positive D current component can increase the torque produced by the ECM 12 due to magnetic reluctance (attraction of the rotor iron to the electromagnet coils in the stator). In all ECMs, a negative D component can be used to allow the ECM 12 to spin faster than the available power supply voltage would otherwise allow. In non-salient ECMs, the D-axis current has no effect on torque, in which case only negative D current has any advantage.

The term "salient" or "saliency" arises because one of the ways of achieving this effect (although not the only way) is to cut notches into the surface of the rotor so that some points stick out (are "salient") and others do not. Since permanent magnet material is already magnetically saturated, in the sense of the derivative of the flux-density (B field) versus magnetic field (H field), it acts just like air, so instead of notches, saliency can also be achieved by gaps in the magnet placement. Saliency is produced by any arrangement which causes a varying total effective "air gap" at each point of the motor's circumference as the rotor rotates. Saliency therefore also shows up as a variation in the inductance measured between pairs of phase wires as the rotor is turned.

The motor controller 10 uses two Hall-effect current sensors 44, 46 to sense the three motor phase currents. Two sensors are sufficient for three current measurements because Kirchoff's Current Law (KCL) requires that the sum of all three currents be zero since the ECM 12 has no additional current path in or out of the windings besides the three phase wires. The two directly-measured phase currents are known as B and C. The A current is computed as the negative of the sum of B and C currents.

The motor controller 10 performs a "Park-Clarke Transform" via logic in the control unit 18. The control unit 18 takes the B and C measured currents, as well as the present rotor angle estimate, and computes D and Q axis measured current. To re-iterate what was explained above in a more concise form—these D and Q currents represent the projection of the magnetic field of the actual physical currents in the stator into a frame of reference which rotates synchronously with the rotor, so that the D and Q currents are the conceptual current which would have to flow in conceptual coils on the rotor to produce the same air-gap magnetic field as the actual, physical stator coils do.

The measured D and Q currents are fed as feedback inputs to two negative-feedback closed-loop controllers with proportional-integral (PI) compensators. These controllers also accept D and Q axis current set points and produce D and Q axis voltage signals as outputs. These signals are the D and Q axis voltage control effort as a fraction of the present power supply (battery) voltage of the motor controller 10. The voltage vector is then converted from rectangular/Cartesian coordinates to polar coordinates, as modulation amplitude M and angle $\Theta_{control}$. The rotor angle and $\Theta_{control}$ are then added to produce $\Theta_{output}$.

Space Vector Modulation (SVM) is a standard method for converting from M, $\Theta_{output}$ voltage vector to three pulse width modulation (PWM) duty cycle percentages, one for each phase. The control unit 18, instead of simply synthesizing three sinusoidal voltages, synthesizes waveforms whose pairwise differences are sinusoids (i.e., phase to phase voltage is still sinusoidal) but whose peak phase to ground voltage is slightly lower than it would be for three sinusoids whose differences were the same. This allows larger line-line voltage sinusoids to be synthesized for the same bus voltage, at the expense of the average of the three phase voltages to ground not being zero, which may not represent a significant disadvantage for particular applications. The motor controller 10 uses the particular form of SVM known as alternating-reversing duty cycle with two null vectors. The control unit 18 includes a three-phase PWM module that converts the three duty cycle numbers into PWM drive signals to control the low and high-side MOSFETs 42 of the switching assembly 16.

Rotor Angle Estimation Overview

The motor controller 10 is configurable to control any of a variety of different types of ECMs with respect to generation of signals by the ECM 12 that can be used to estimate rotor angle. The Vector Sine Drive/Field Oriented Control (VSD/FOC) Engine implemented in the control unit 18 relies on a decent estimate of the rotor angle. The control unit 18 can be configured (e.g., via programming of a motor type data value) to produce this rotor angle estimate in any one of three ways, as detailed in the next three sections.

Rotor Angle Estimation Via Hall Effect Sensor and Incremental Encoder Signals

Figure 3:
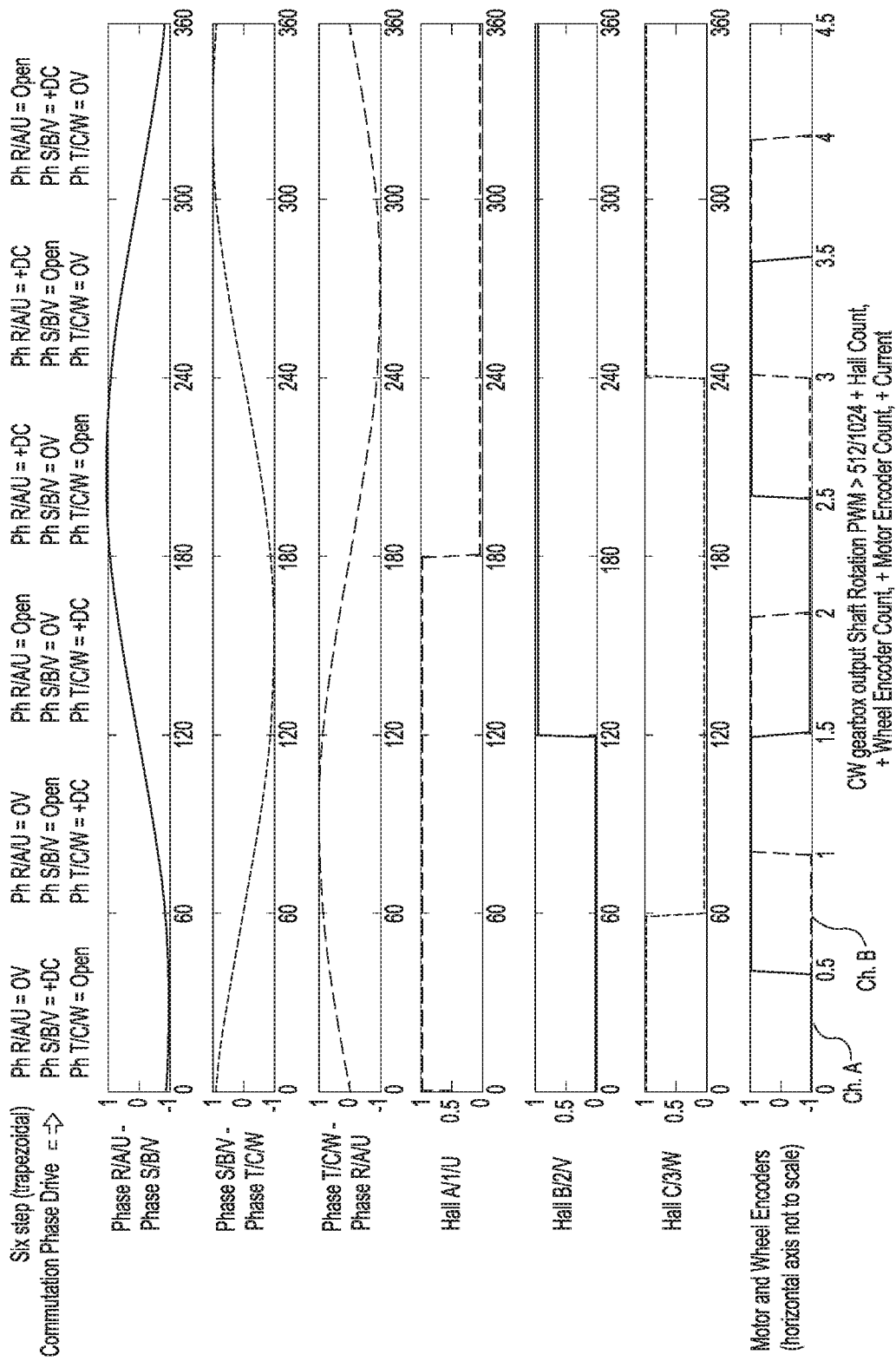
FIG. 3 shows a motor commutation chart for ECMs with Hall effect sensors, motor encoders and wheel encoders, in accordance with many embodiments.

FIG. 3 shows a motor commutation chart for ECMs with Hall effect sensors and wheel encoders. For ECMs with Hall effect sensors and encoders, the control unit 18 loads an initial rotor angle estimate based on the present state of the motor's Hall effect sensors. The Hall effect sensors are digital (on/off) magnetic field sensors that use either the main permanent magnets of the rotor or auxiliary tiny magnets to sense the rotor angle and translate it into a 3-bit digital number. Out of the 8 possible states of a 3-bit number, 6 of them are valid "Hall states", each of which indicates a particular 60°-wide segment of the 360° of rotation. Instead of this Hall state 3-bit number repeating once per physical, mechanical rotation of the motor rotor, it repeats once per electrical rotation cycle of the motor. There may be any positive integer number of electrical cycles per physical rotation depending on the design of the ECM 12. The ratio between the two (electrical cycles/physical rotations) equals the number of "pole-pairs" of the permanent magnets on the rotor. This is half of the number of "poles" on the rotor.

Once the initial angle estimate is loaded, it will have up to +/−30° error because of the fact that the segment corresponding to the existing Hall state is 60° wide. The outputs of the incremental encoder (if present) are decoded using the standard quadrature decoding and the angle estimate is incremented or decremented according to the way the encoder indicates that the rotor has turned.

Figure 4:
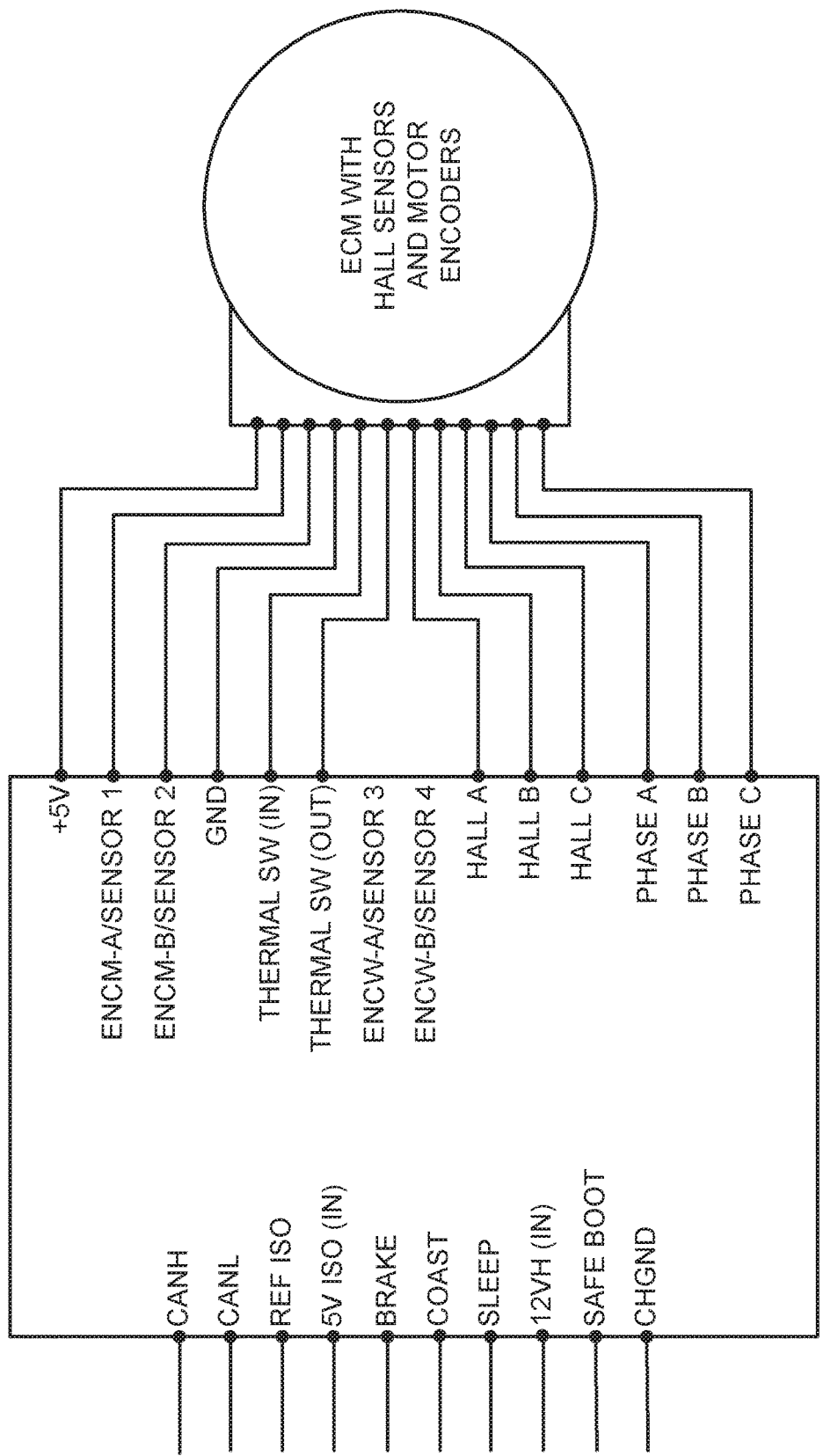
FIG. 4 is a simplified schematic diagram illustrating the motor controller of FIG. 1 connected to an ECM that includes Hall effect sensors and motor encoders that generate output used by the motor controller to estimate rotor orientation and control the ECM, in accordance with many embodiments.
Figure 5:
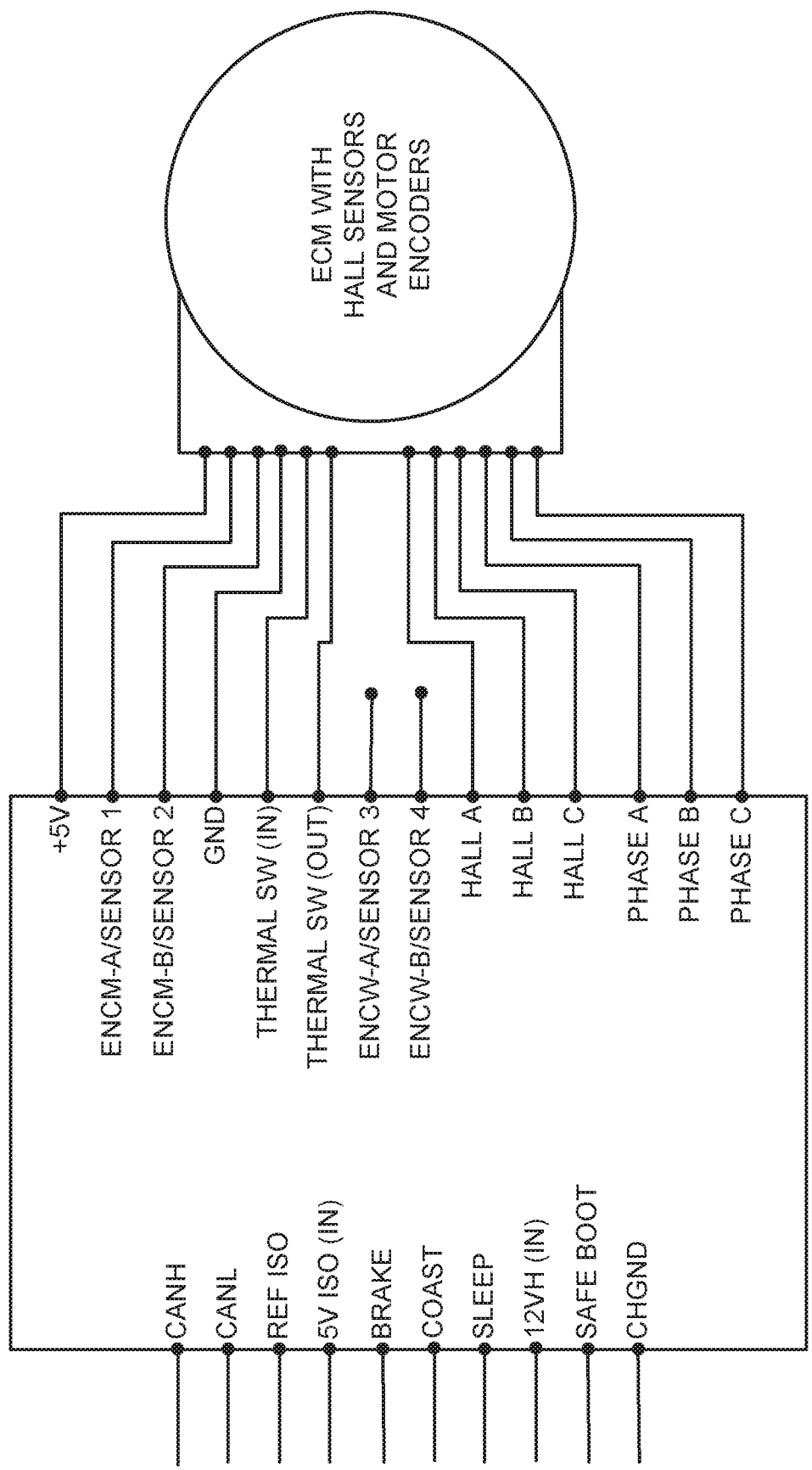
FIG. 5 is a simplified schematic diagram illustrating the motor controller of FIG. 1 connected to an ECM that includes Hall effect sensors and motor encoders and to wheel encoders external to the ECM that generate output used by the motor controller to estimate rotor orientation and control the ECM, in accordance with many embodiments.
Figure 6:
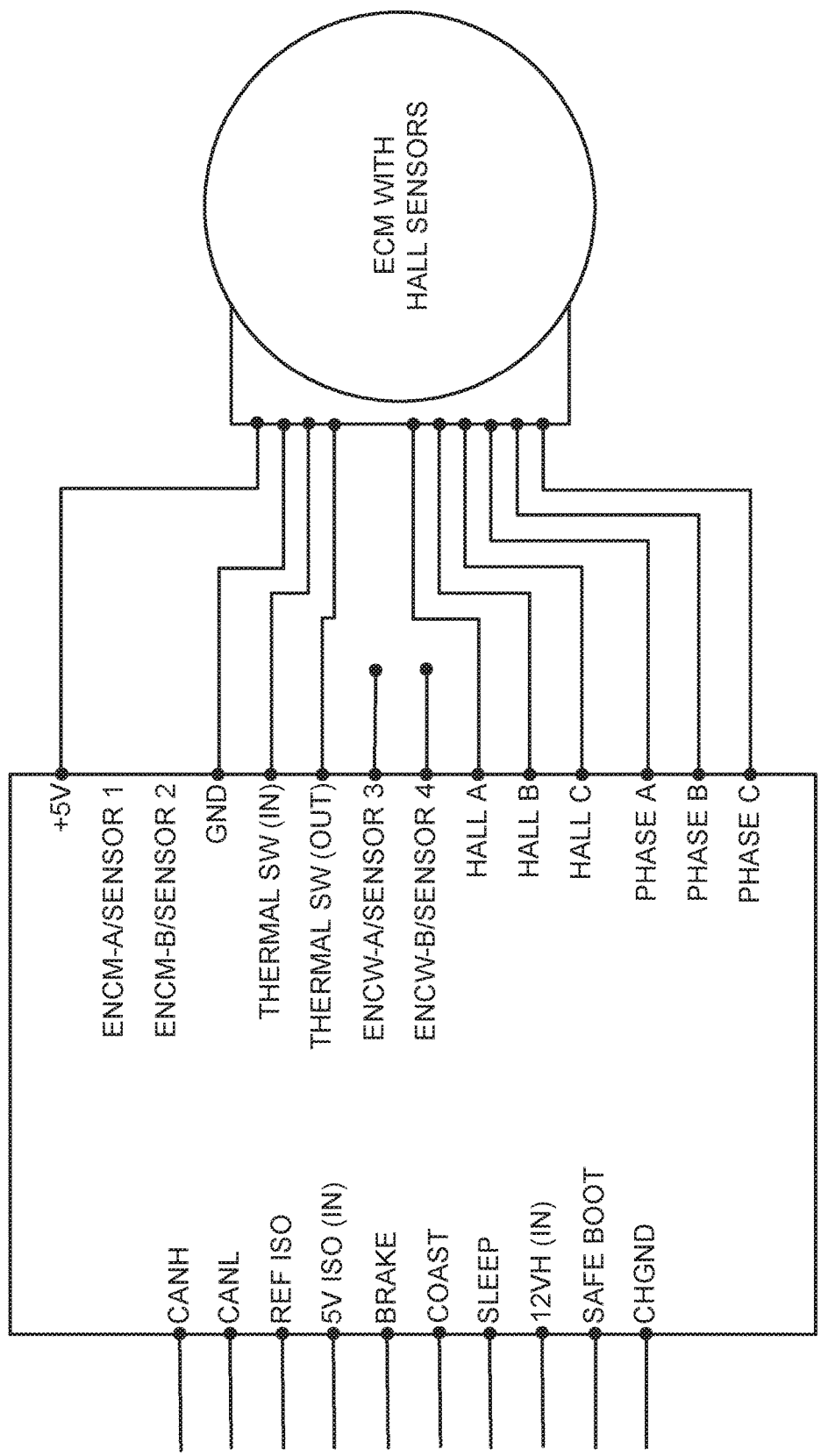
FIG. 6 is a simplified schematic diagram illustrating the motor controller of FIG. 1 connected to an ECM that includes Hall effect sensors and to wheel encoders external to the ECM that generate output used by the motor controller to estimate rotor orientation and control the ECM, in accordance with many embodiments.

When the Hall state changes, the control unit 18 then knows the exact rotor angle because it knows the "before" and "after" Hall states, which means that the actual angle is right on the boundary between these two states. This is used to update the angle estimate by simply loading it with the angle at which this boundary occurs in the construction of the motor. FIG. 4 schematically illustrates electrical connections between the motor controller 10 and an ECM 12 that includes Hall effect sensors and motor encoders that generate output used by the motor controller 10 to estimate rotor orientation and control the ECM 12. FIG. 5 schematically illustrates electrical connections between the motor controller 10 and an ECM 12 that includes Hall effect sensors and motor encoders and to wheel encoders external to the ECM 12 that generate output used by the motor controller 10 to estimate rotor orientation and control the ECM 12. Wheel encoders can be mounted to a drive wheel or other suitable member external to the ECM 12 that is rotated by the ECM 12. FIG. 6 schematically illustrates electrical connections between the motor controller 10 and an ECM 12 that includes Hall effect sensors and to wheel encoders external to the ECM 12 that generate output used by the motor controller 10 to estimate rotor orientation and control the ECM 12.

Figure 7:
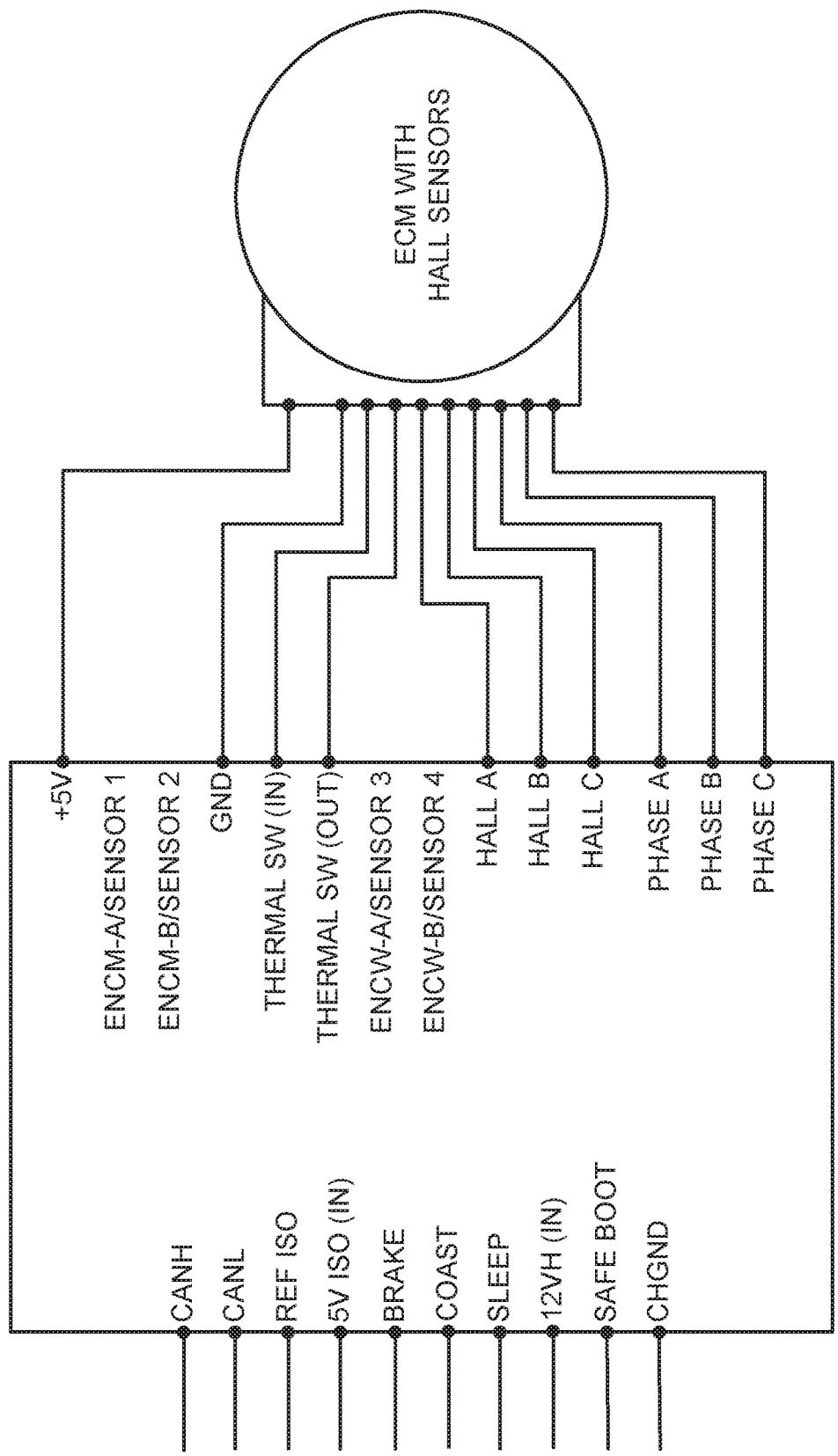
FIG. 7 is a simplified schematic diagram illustrating the motor controller of FIG. 1 connected to an ECM that includes Hall effect sensors that generate output used by the motor controller to estimate rotor orientation and control the ECM, in accordance with many embodiments.

If only Hall sensors are present, this mode results in a coarse six-angle-steps per electrical cycle. In the absence of encoder data, a rotation rate of the rotor can be estimated based on time spans between adjacent Hall state changes and used to update the rotor position estimate between Hall state changes. FIG. 7 schematically illustrates electrical connections between the motor controller 10 and an ECM 12 that only includes Hall effect sensors to generate output used by the motor controller 10 to estimate rotor orientation and control the ECM 12. If Hall sensors and a motor rotor incremental encoder are present, then the estimated rotor angle is refined considerably. If no Hall sensors are present, then this mode cannot be used.

Rotor Angle Estimation Via Incremental Encoder Signals Plus Saliency

Figure 8:
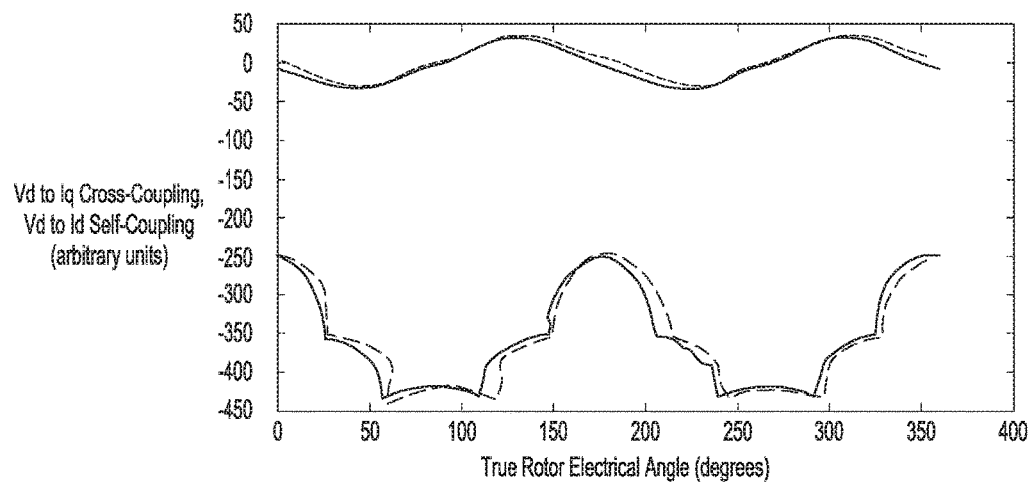
FIG. 8 shows a chart of saliency inductance data as a function of true rotor electrical angle for several samples of a particular ECM type.

FIG. 8 shows a chart of saliency inductance data as a function of true rotor electrical angle for several samples of a particular ECM type. If an incremental encoder is present, then only an initial rotor angle estimate needs to be obtained from another source and then the encoder can track the rotor orientation perfectly from there forward. The motor controller 10 can be configured to generate the initial rotor angle estimate for ECMs having certain predictable and consistent saliency properties.

The motor controller 10 is configured to measure variation in motor inductance versus rotor angle using the following approach. First, the control unit 18 controls the switching assembly 16 to apply a known amplitude and phase 100 Hz sinusoidal voltage to the motor phases. The applied sinusoidal voltage is generated by inputting a sinusoidally-time-varying D or Q voltage into the rectangular to polar conversion and then onward through the SVM and PWM modules. The resulting D and Q axis currents are measured. All of this is done with the actual physical rotor being held still by its inertia against the 100 Hz vibration, and the rotor angle used by the VSD Engine being a fixed known value, which is zero for most of the functions used by control unit 18.

Since the D and Q axis voltage commands are proportional to the power supply voltage and the current measurements are absolute, the control unit 18 compensates based on the measured supply voltage. The compensation is accomplished by adjusting the raw D and Q axis voltage sinusoid amplitude according to the measured supply voltage, producing a nearly constant voltage drive as the supply varies between 30 and 50 volts.

The D and Q axis current measurements are synchronously-demodulated by multiplying by unit sine and cosine functions, which are in-phase and quadrature to the driving voltage sinusoid, and then low-pass filtered to remove remnants of the 100 Hz and higher frequency content. This is a standard technique known as IQ demodulation or "lock-in" detection. The quadrature component represents inductance while the in-phase one represents AC resistance. In many embodiments, the control unit 18 uses only the inductance component. These measurements follow curves like those shown in FIG. 8. The horizontal axis is the actual true rotor electrical angle and the vertical axis is the result of each of the two measurements (the bottom curve is with the voltage excitation applied to the D axis and the D axis current being measured and the top curve is also with the excitation on the D axis but with the Q axis current as the measurement).

The control unit 18 is configured to store the inductance functions for an applicable type(s) of the ECM 12 in lookup table form with the vertical axis (measurement) as the index, and perform a lookup to obtain the set of possible rotor angles corresponding to the measured inductance component. Using these lookup table results along with a decision tree that chooses which portion of which curve to use based on all of the measurements, the control unit 18 arrives at two rotor angle estimates. There are two resulting possible rotor angle estimates because all of these saliency inductance functions exhibit 180° symmetry and therefore cannot be used to differentiate between two rotor angles 180° apart.

Figure 9:
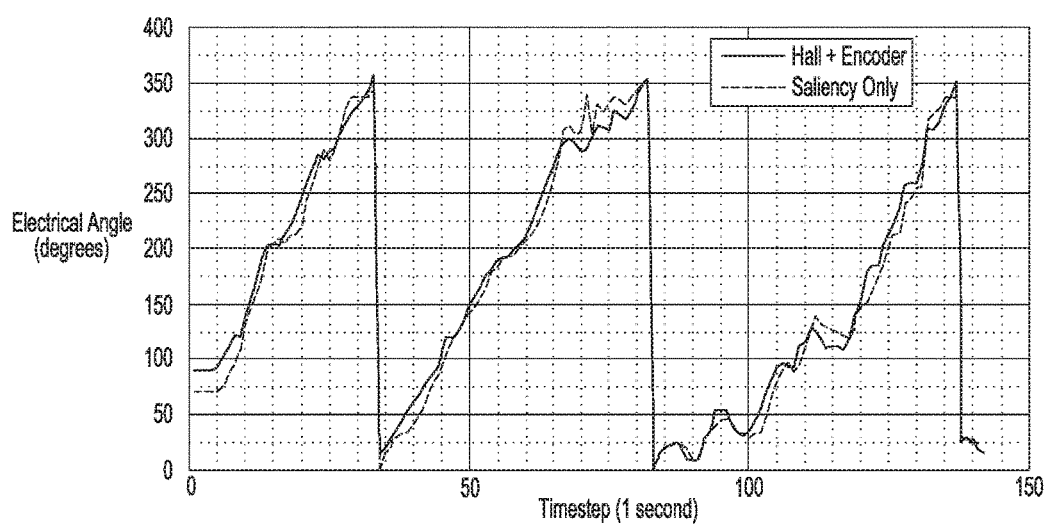
FIG. 9 shows a chart of example rotor orientation angle determinations via saliency inductance measurement alone and corresponding rotor orientation angle determination via Hall effect sensor and encoder tracking, in accordance with many embodiments.

The motor controller 10 performs a final disambiguation to identify the initial rotor orientation estimate by applying a known DC voltage along the Q axis, using one of the two rotor angle estimates, for just a long enough duration to cause a small rotor motion. The applied DC voltage induces a resulting DC Q-axis current, which produces positive (clockwise) torque if the used angle estimate is correct. If the used angle estimate is correct, then the used angle estimate is retained and used. If the used angle estimate is not correct, the used angle estimate is flipped by 180°. The identified final angle estimate is then loaded into the register that holds the real-time estimate and is also updated by incremental encoder counts as the rotor angle subsequently changes. FIG. 9 shows a chart comparing example initial rotor orientation angles estimates determined via saliency inductance measurement alone and corresponding rotor orientation angle estimates determined via Hall effect sensor and encoder tracking.

Figure 10:
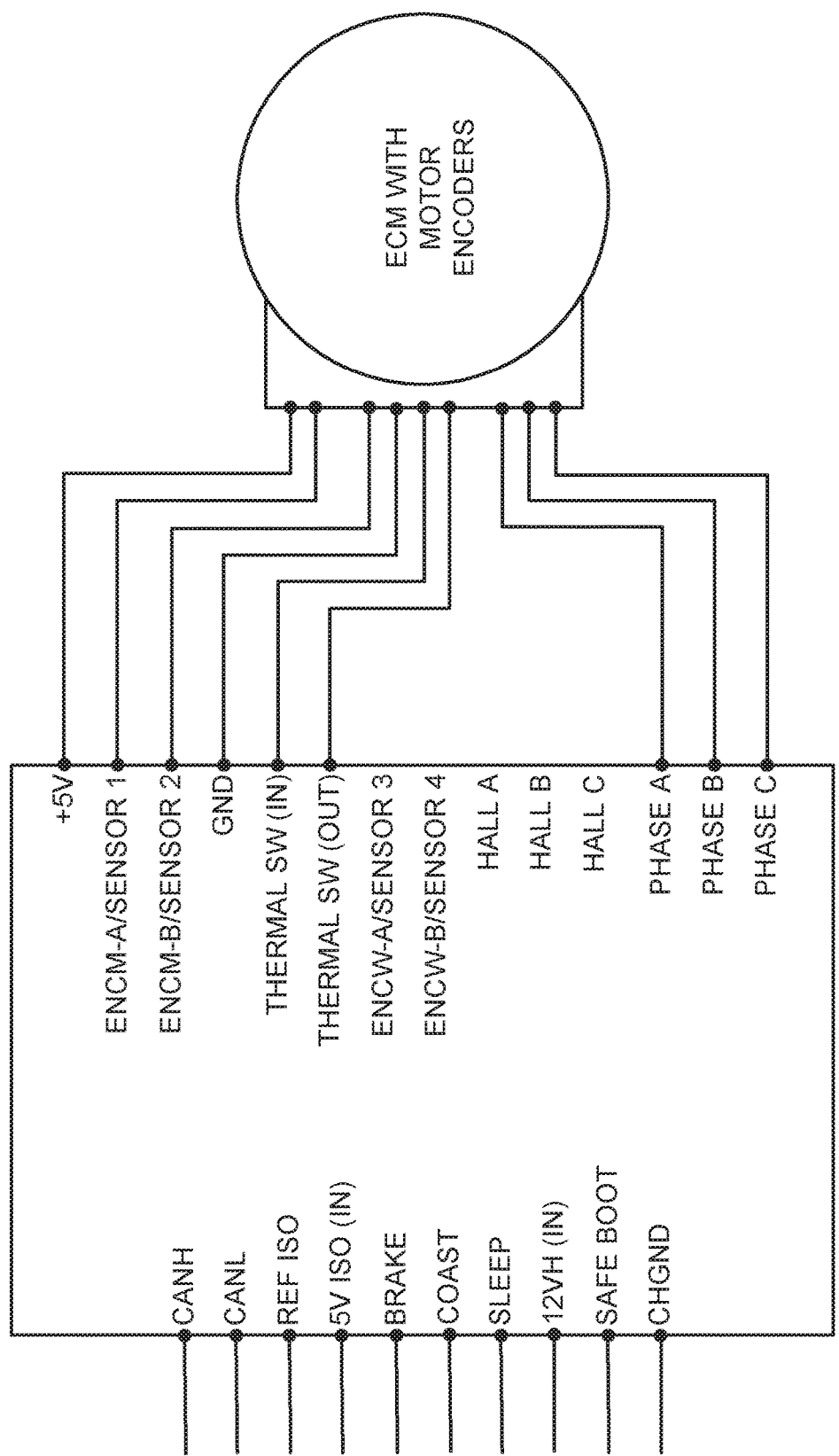
FIG. 10 is a simplified schematic diagram illustrating the motor controller of FIG. 1 connected to an ECM that includes motor encoders that generate output used by the motor controller to estimate rotor orientation and control the ECM, in accordance with many embodiments.
Figure 11:
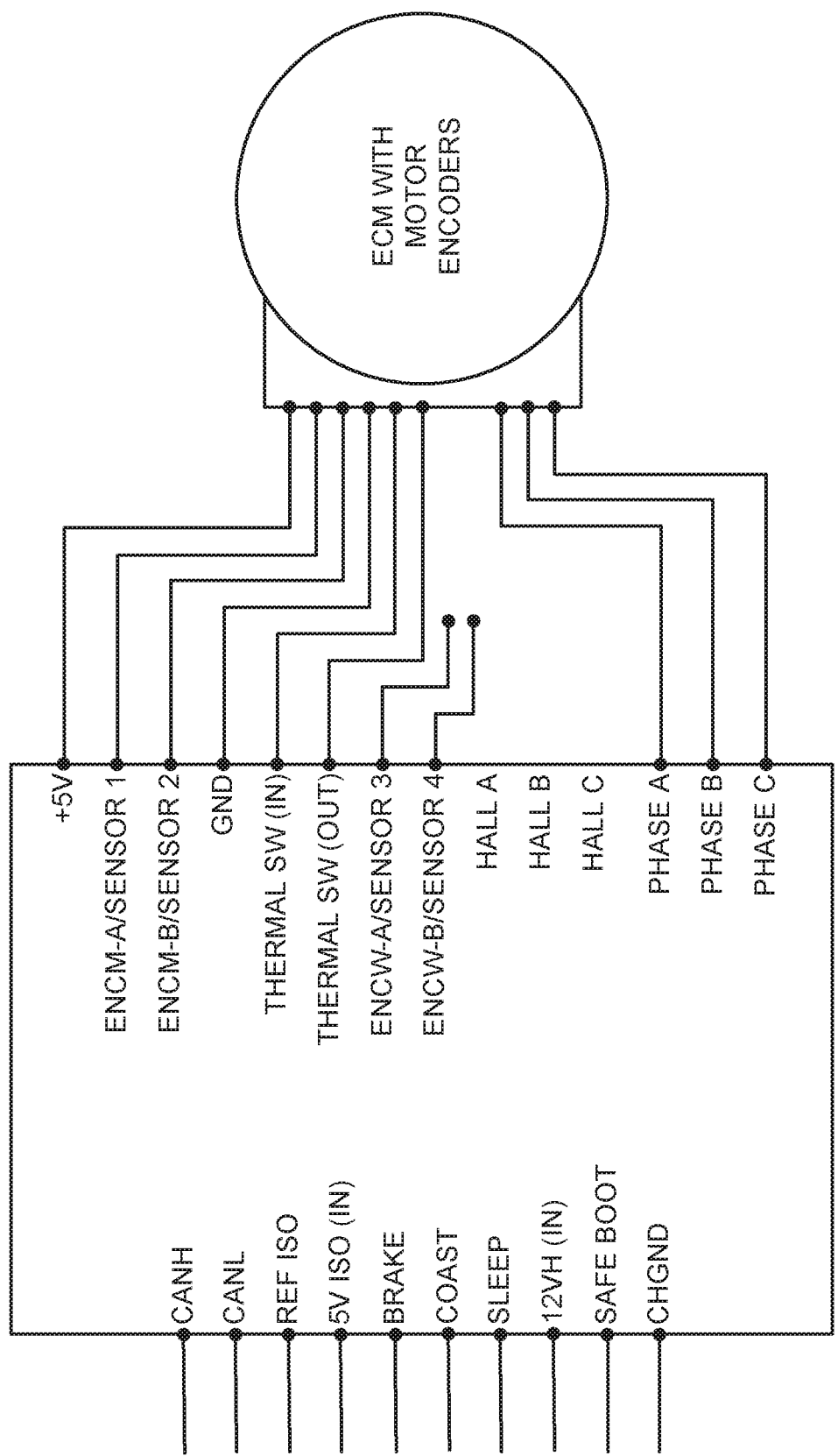
FIG. 11 is a simplified schematic diagram illustrating the motor controller of FIG. 1 connected to an ECM that includes motor encoders and to wheel encoders external to the ECM that generate output used by the motor controller to estimate rotor orientation and control the ECM, in accordance with many embodiments.
Figure 12:
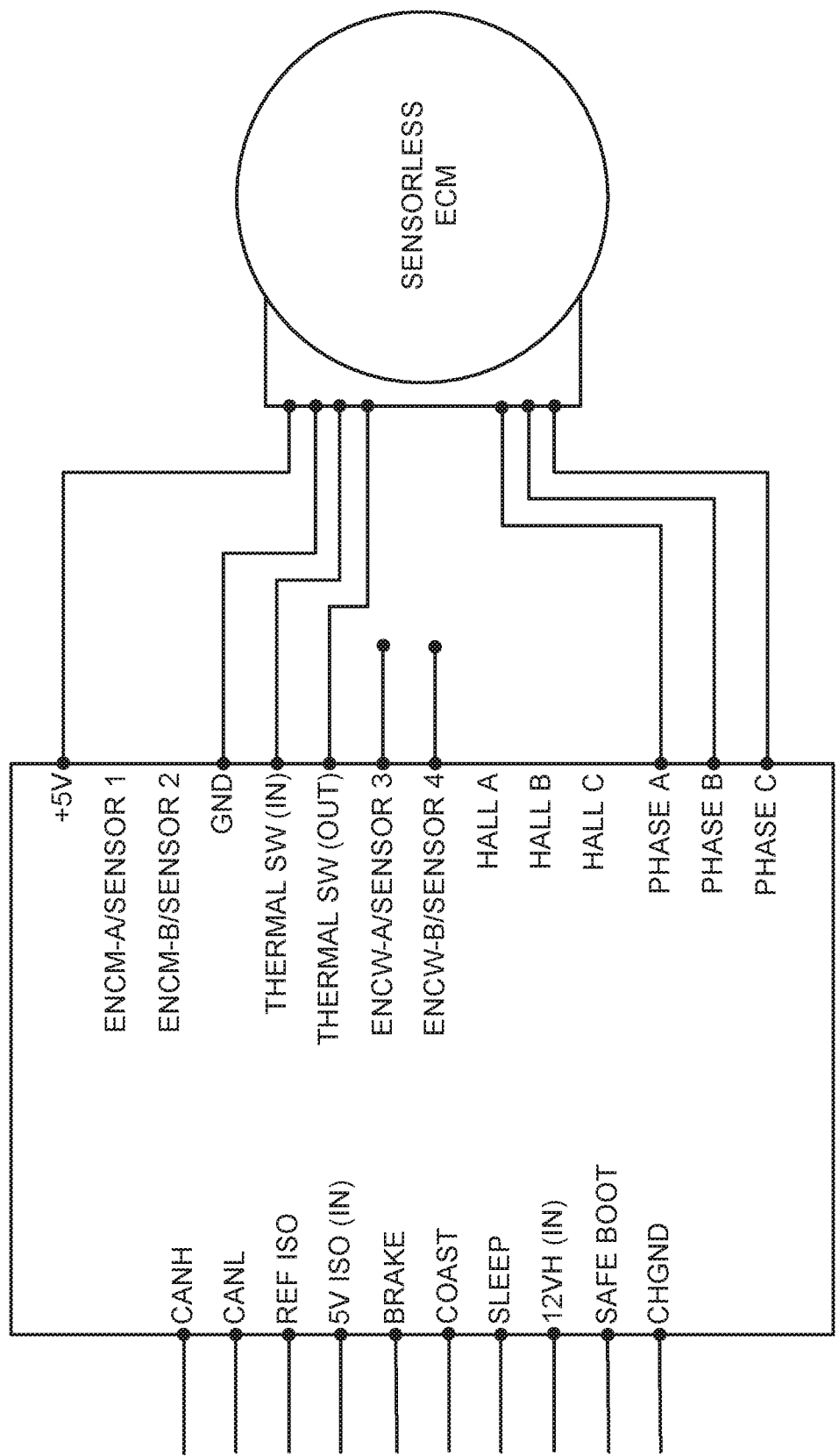
FIG. 12 is a simplified schematic diagram illustrating the motor controller of FIG. 1 connected to an ECM and to wheel encoders external to the ECM that generate output used by the motor controller to estimate rotor orientation and control the ECM, in accordance with many embodiments.

FIG. 10 schematically illustrates electrical connections between the motor controller 10 and an ECM 12 that includes motor encoders that generate output used by the motor controller 10 to estimate rotor orientation and control the ECM 12. FIG. 11 schematically illustrates electrical connections between the motor controller 10 and an ECM 12 that includes motor encoders and to wheel encoders external to the ECM 12 that generate output used by the motor controller 10 to estimate rotor orientation and control the ECM 12. FIG. 12 schematically illustrates electrical connections between the motor controller 10 and a sensorless ECM 12 and to wheel encoders external to the ECM 12 that generate output used by the motor controller 10 to estimate rotor orientation and control the ECM 12.

Rotor Angle Estimation Via Back Electromotive Force Only

The final method the control unit 18 has for estimating rotor angle requires no motor-based sensors at all, but may only work for ECMs that are not subject to a high torque load at low speed. This final method is known as back-EMF rotor position tracking and is based on a form of a phase locked loop (PLL) with a phase-frequency detector (PFD, with phase information from D-axis voltage and frequency information from Q-axis voltage). Phase here means rotor angle and frequency means electrical rotational frequency of the motor rotor.

First, the motor controller 10 forces the rotor to a known initial angle by energizing the phases in a known pattern. This causes the ECM 12 to act like a coarse-resolution stepper motor. This initial positioning of the rotor requires that the load on the motor be light enough to permit the repositioning of the rotor.

Figure 13:
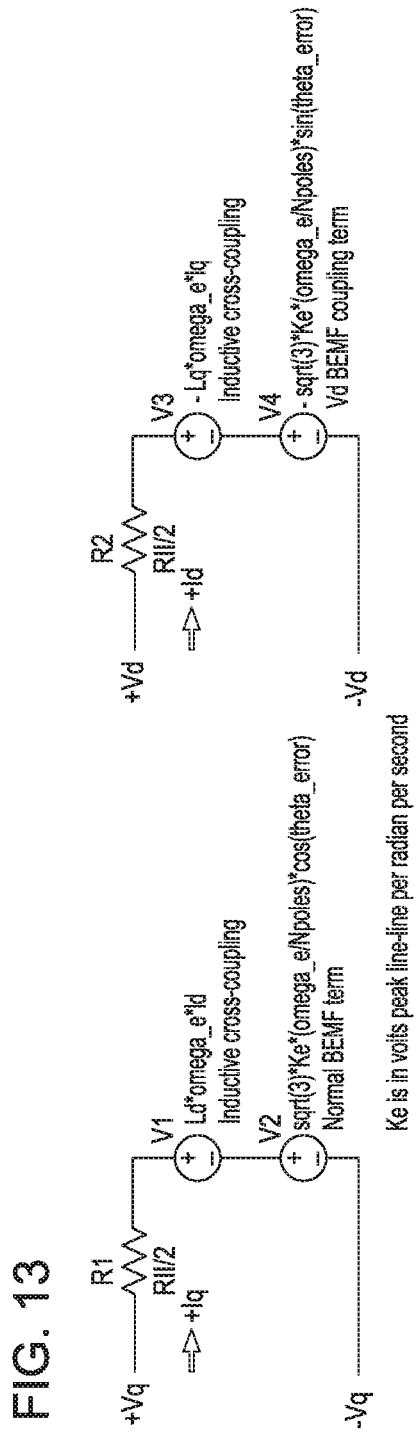
FIG. 13 is a simplified schematic diagram illustrating a circuit model of DQ voltage and current with error in rotor angle estimation, in accordance with many embodiments.
Figure 14:
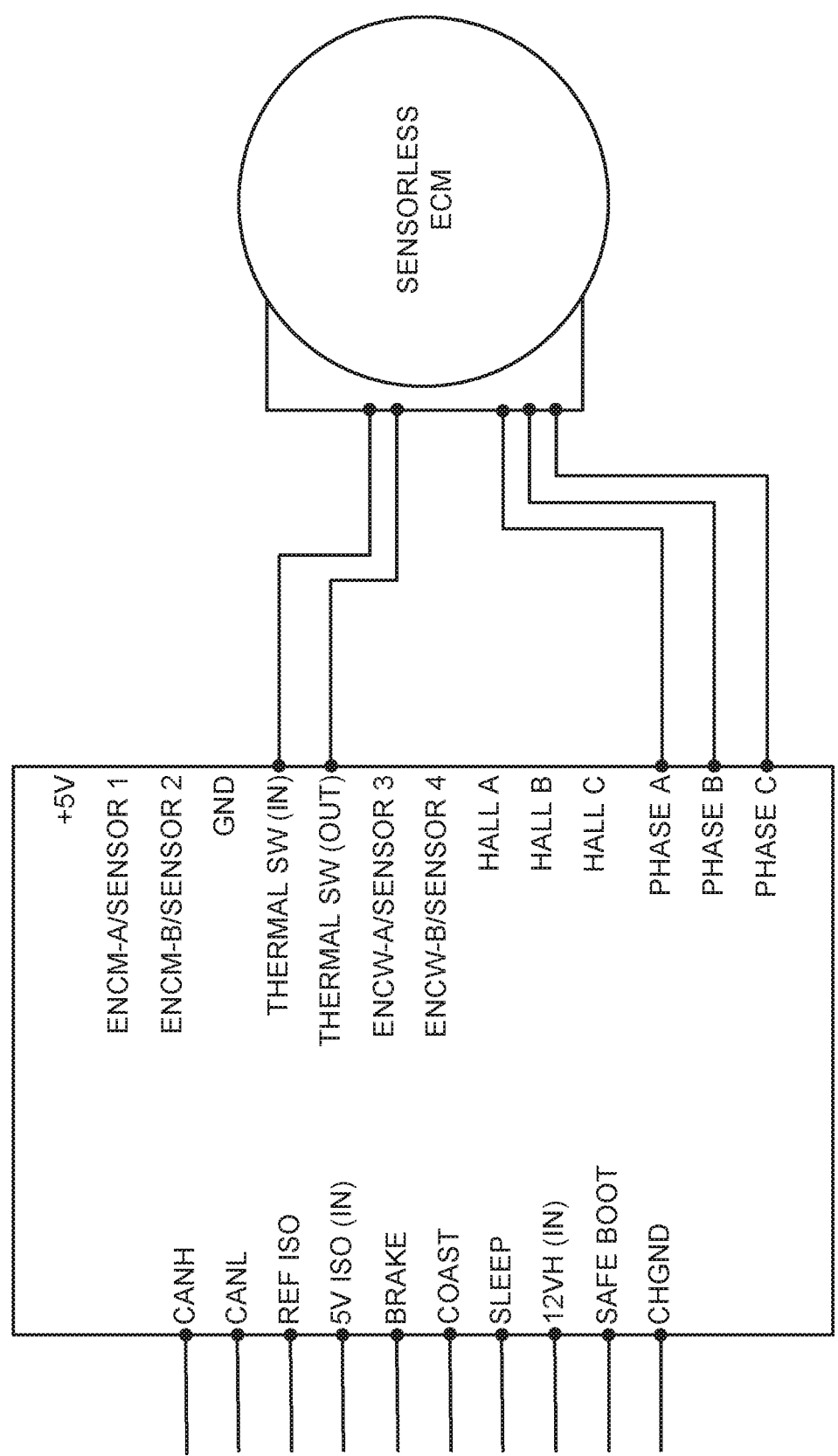
FIG. 14 is a simplified schematic diagram illustrating the motor controller of FIG. 1 connected to an ECM that lacks any sensors that generate output that can be used by the motor controller to estimate rotor orientation and control the ECM, in accordance with many embodiments.

From this initial known angle, the control unit 18 tracks the rotor position by (a) estimating rotor speed from the Q-axis voltage required to drive current into the motor, divided by the back electromotive force (BEMF) constant of the motor, (b) numerically integrating the speed to obtain the change in rotor angle, and (c) making gradual phase adjustments by attempting to drive the D-axis BEMF coupling to zero. D-axis BEMF coupling is the full D-axis voltage minus the inductive cross coupling and resistive terms. FIG. 13 is a simplified schematic diagram illustrating a circuit model of DQ voltage and current with error in the approach employed by the control unit 18 to track the rotor angle. The control unit 18 employs a proportional-integral (PI) speed control loop that takes the estimated rotor speed (from Q-axis voltage) and drives the Q-axis current to achieve the desired speed. FIG. 14 schematically illustrates electrical connections between the motor controller 10 and a sensorless ECM 12.

Fault Monitoring

Beyond the basic motor drive function, the motor controller 10 is configured to perform a variety of fault monitoring such as over-temperature, over-speed, and over-voltage protection. In many embodiments, the motor controller 10 is also configured to ensure that the total commanded current remains below a Present Current Limit (PCL) via a foldback current limit. Foldback current limit protects the MOSFETs of the switching assembly 16 and the ECM 12 from rapid thermal damage in high commanded current situations. Foldback current limit protection is accomplished by maintaining a value called the Present Current Limit (PCL) as well as two programmable constants—spike current limit and continuous current limit. As long as the commanded total DQ current ($sqrt(Id^2+Iq^2)$) remains below the continuous current limit, the PCL remains at the spike current limit value, which is higher than the continuous current limit. When the commanded current exceeds the continuous current limit, the PCL is lowered at the rate of 0.2 amps per second per amp of excess commanded current above the continuous limit. In other words, the rate at which PCL is ramped down is $0.2*(sqrt(Id^2+Iq^2)-continuous\_current\_limit)$ amps per second. The PCL will stop ramping down when it reaches the continuous current limit. Likewise, when the commanded current is below the continuous current limit, PCL will ramp up at the rate of is $0.2*(continuous\_current\_limit-sqrt(Id^2+Iq^2))$ amps per second.

At each instant in time, if the commanded current ($sqrt(Id^2+Iq^2)$) is less than PCL, the commanded current is fed through to the PI current controller set points. If, however, the commanded current exceeds PCL, then the D-axis command is fed through un-altered but the Q-axis command is reduced to $sqrt(PCL^2-Id^2)*sign(Iq)$ where Id and Iq are the commanded Id and Iq, respectively. If this would result in an imaginary number, then Iq is set to zero and Id is set equal to PCL.

The foldback current limit ensures that the commanded total current (in the sense of the Euclidean norm of the DQ current vector) remains at or below PCL at all times. The D-axis is prioritized because, when using the D-axis to perform field weakening, it would have a more detrimental effect on the ability to drive the motor if the D-axis current were reduced compared to the Q-axis current being reduced.

The motor controller 10 is also configured to monitor for a current control fault in which the PI controllers are unstable or otherwise do not cause the current to follow the commanded values. The control unit 18 does this by computing, at each instant in time, the sum $abs(Id-Id\_cmd)+abs(Iq-Iq\_cmd)$, which is the 1-norm of the current error vector. This is then fed into a first order low-pass filter with a suitable time-constant (e.g., 100 milliseconds). If the output of this exceeds a preset threshold value, then the motor controller 10 will shut off all current flow and declare a current control fault via the CANBUS.

Example Implementation—Inventory Management System

Figure 15:
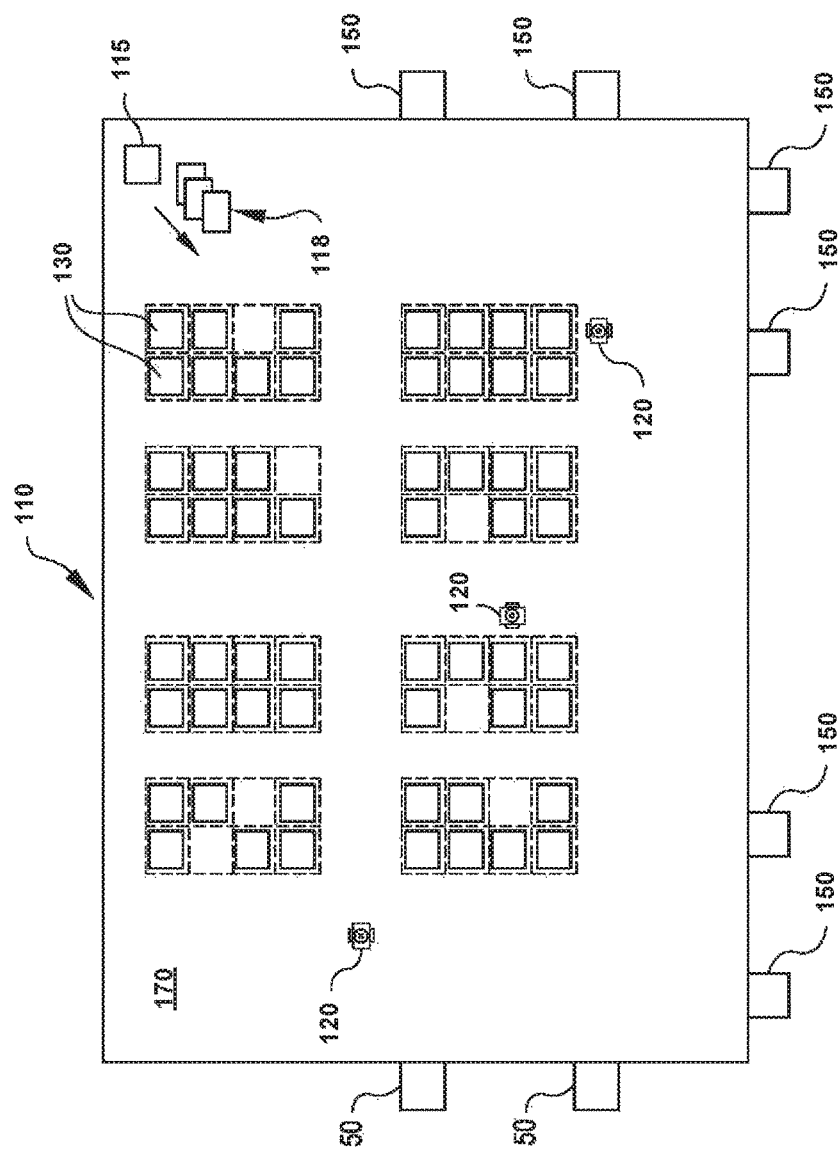
FIG. 15 illustrates components of an inventory system that employs mobile drive units that include a plurality of the motor controllers of FIG. 1, in accordance with many embodiments.

FIG. 15 illustrates the contents of an inventory system 110. Inventory system 110 includes a management module 115, one or more mobile drive units 120, one or more inventory holders 130, and one or more inventory stations 150. Mobile drive units 120 transport inventory holders 130 between points within a workspace 170 in response to commands communicated by management module 115. Each inventory holder 130 stores one or more types of inventory items. As a result, inventory system 110 is capable of moving inventory items between locations within workspace 170 to facilitate the entry, processing, and/or removal of inventory items from inventory system 110 and the completion of other tasks involving inventory items.

Management module 115 assigns tasks to appropriate components of inventory system 110 and coordinates operation of the various components in completing the tasks. These tasks may relate not only to the movement and processing of inventory items, but also to the management and maintenance of the components of inventory system 110. For example, management module 115 may assign portions of workspace 170 as parking spaces for mobile drive units 120, the scheduled recharge or replacement of mobile drive unit batteries, the storage of empty inventory holders 130, or any other operations associated with the functionality supported by inventory system 110 and its various components. Management module 115 may select components of inventory system 110 to perform these tasks and communicate appropriate commands and/or data to the selected components to facilitate completion of these operations. Although shown in FIG. 15 as a single, discrete component, management module 115 may represent multiple components and may represent or include portions of mobile drive units 120 or other elements of inventory system 110. As a result, any or all of the interaction between a particular mobile drive unit 120 and management module 115 that is described below may, in particular embodiments, represent peer-to-peer communication between that mobile drive unit 120 and one or more other mobile drive units 120.

Mobile drive units 120 move inventory holders 130 between locations within workspace 170. Mobile drive units 120 may represent any devices or components appropriate for use in inventory system 110 based on the characteristics and configuration of inventory holders 130 and/or other elements of inventory system 110. In a particular embodiment of inventory system 110, mobile drive units 120 represent independent, self-powered devices configured to freely move about workspace 170. Examples of such inventory systems are disclosed in U.S. Pat. No. 9,087,314, issued Jul. 21, 2015, titled "SYSTEM AND METHOD FOR POSITIONING A MOBILE DRIVE UNIT" and U.S. Pat. No. 8,280,547, issued on Oct. 2, 2012, titled "METHOD AND SYSTEM FOR TRANSPORTING INVENTORY ITEMS", the entire disclosures of which are herein incorporated by reference. In alternative embodiments, mobile drive units 120 represent elements of a tracked inventory system configured to move inventory holder 130 along tracks, rails, cables, crane system, or other guidance or support elements traversing workspace 170. In such an embodiment, mobile drive units 120 may receive power and/or support through a connection to the guidance elements, such as a powered rail. Additionally, in particular embodiments of inventory system 110 mobile drive units 120 may be configured to utilize alternative conveyance equipment to move within workspace 170 and/or between separate portions of workspace 170. The contents and operation of an example embodiment of a mobile drive unit 120 are discussed further below with respect to FIGS. 16 through 19.

Additionally, mobile drive units 120 may be capable of communicating with management module 115 to receive information identifying selected inventory holders 130, transmit the locations of mobile drive units 120, or exchange any other suitable information to be used by management module 115 or mobile drive units 120 during operation. Mobile drive units 120 may communicate with management module 115 wirelessly, using wired connections between mobile drive units 120 and management module 115, and/or in any other appropriate manner. As one example, particular embodiments of mobile drive unit 120 may communicate with management module 115 and/or with one another using 802.11, Bluetooth, or Infrared Data Association (IrDA)

standards, or any other appropriate wireless communication protocol. As another example, in a tracked inventory system 110, tracks or other guidance elements upon which mobile drive units 120 move may be wired to facilitate communication between mobile drive units 120 and other components of inventory system 110. Furthermore, as noted above, management module 115 may include components of individual mobile drive units 120. Thus, for the purposes of this description and the claims that follow, communication between management module 115 and a particular mobile drive unit 120 may represent communication between components of a particular mobile drive unit 120. In general, mobile drive units 120 may be powered, propelled, and controlled in any manner appropriate based on the configuration and characteristics of inventory system 110.

Inventory holders 130 store inventory items. In a particular embodiment, inventory holders 130 include multiple storage bins with each storage bin capable of holding one or more types of inventory items. Inventory holders 130 are capable of being carried, rolled, and/or otherwise moved by mobile drive units 120. In particular embodiments, inventory holder 130 may provide additional propulsion to supplement that provided by mobile drive unit 120 when moving inventory holder 130.

Additionally, in particular embodiments, inventory items 140 may also hang from hooks or bars (not shown) within or on inventory holder 130. In general, inventory holder 130 may store inventory items 140 in any appropriate manner within inventory holder 130 and/or on the external surface of inventory holder 130.

Additionally, each inventory holder 130 may include a plurality of faces, and each bin may be accessible through one or more faces of the inventory holder 130. For example, in a particular embodiment, inventory holder 130 includes four faces. In such an embodiment, bins located at a corner of two faces may be accessible through either of those two faces, while each of the other bins is accessible through an opening in one of the four faces. Mobile drive unit 120 may be configured to rotate inventory holder 130 at appropriate times to present a particular face and the bins associated with that face to an operator or other components of inventory system 110.

Inventory items represent any objects suitable for storage, retrieval, and/or processing in an automated inventory system 110. For the purposes of this description, "inventory items" may represent any one or more objects of a particular type that are stored in inventory system 110. Thus, a particular inventory holder 130 is currently "storing" a particular inventory item if the inventory holder 130 currently holds one or more units of that type. As one example, inventory system 110 may represent a mail order warehouse facility, and inventory items may represent merchandise stored in the warehouse facility. During operation, mobile drive units 120 may retrieve inventory holders 130 containing one or more inventory items requested in an order to be packed for delivery to a customer or inventory holders 130 carrying pallets containing aggregated collections of inventory items for shipment. Moreover, in particular embodiments of inventory system 110, boxes containing completed orders may themselves represent inventory items.

In particular embodiments, inventory system 110 may also include one or more inventory stations 150. Inventory stations 150 represent locations designated for the completion of particular tasks involving inventory items. Such tasks may include the removal of inventory items from inventory holders 130, the introduction of inventory items into inventory holders 130, the counting of inventory items in inventory holders 130, the decomposition of inventory items (e.g., from pallet- or case-sized groups to individual inventory items), the consolidation of inventory items between inventory holders 130, and/or the processing or handling of inventory items in any other suitable manner. In particular embodiments, inventory stations 150 may just represent the physical locations where a particular task involving inventory items can be completed within workspace 170. In alternative embodiments, inventory stations 150 may represent both the physical location and also any appropriate equipment for processing or handling inventory items, such as scanners for monitoring the flow of inventory items in and out of inventory system 110, communication interfaces for communicating with management module 115, and/or any other suitable components. Inventory stations 150 may be controlled, entirely or in part, by human operators or may be fully automated. Moreover, the human or automated operators of inventory stations 150 may be capable of performing certain tasks to inventory items, such as packing, counting, or transferring inventory items, as part of the operation of inventory system 110.

Workspace 170 represents an area associated with inventory system 110 in which mobile drive units 120 can move and/or inventory holders 130 can be stored. For example, workspace 170 may represent all or part of the floor of a mail-order warehouse in which inventory system 110 operates. In some embodiments, workspace 170 includes multiple floors, and some combination of ramps, elevators, conveyors, and/or other devices are provided to facilitate movement of mobile drive units 120 and/or other components of the inventory system 110 between the multiple floors. Although FIG. 15 shows, for the purposes of illustration, an embodiment of inventory system 110 in which workspace 170 includes a fixed, predetermined, and finite physical space, particular embodiments of inventory system 110 may include mobile drive units 120 and inventory holders 130 that are configured to operate within a workspace 170 that is of variable dimensions and/or an arbitrary geometry. While FIG. 15 illustrates a particular embodiment of inventory system 110 in which workspace 170 is entirely enclosed in a building, alternative embodiments may utilize workspaces 170 in which some or all of the workspace 170 is located outdoors, within a vehicle (such as a cargo ship), or otherwise unconstrained by any fixed structure.

In operation, management module 115 selects appropriate components to complete particular tasks and transmits task assignments 118 to the selected components to trigger completion of the relevant tasks. Each task assignment 118 defines one or more tasks to be completed by a particular component. These tasks may relate to the retrieval, storage, replenishment, and counting of inventory items and/or the management of mobile drive units 120, inventory holders 130, inventory stations 150 and other components of inventory system 110. Depending on the component and the task to be completed, a particular task assignment 118 may identify locations, components, and/or actions associated with the corresponding task and/or any other appropriate information to be used by the relevant component in completing the assigned task.

In particular embodiments, management module 115 generates task assignments 118 based, in part, on inventory requests that management module 115 receives from other components of inventory system 110 and/or from external components in communication with management module 115. These inventory requests identify particular operations to be completed involving inventory items stored or to be stored within inventory system 110 and may represent communication of any suitable form. For example, in particular embodiments, an inventory request may represent a shipping order specifying particular inventory items that have been purchased by a customer and that are to be retrieved from inventory system 110 for shipment to the customer. Management module 115 may also generate task assignments 118 independently of such inventory requests, as part of the overall management and maintenance of inventory system 110. For example, management module 115 may generate task assignments 118 in response to the occurrence of a particular event (e.g., in response to a mobile drive unit 120 requesting a space to park), according to a predetermined schedule (e.g., as part of a daily start-up routine), or at any appropriate time based on the configuration and characteristics of inventory system 110. After generating one or more task assignments 118, management module 115 transmits the generated task assignments 118 to appropriate components for completion of the corresponding task. The relevant components then execute their assigned tasks.

With respect to mobile drive units 120 specifically, management module 115 may, in particular embodiments, communicate task assignments 118 to selected mobile drive units 120 that identify one or more destinations for the selected mobile drive units 120. Management module 115 may select a mobile drive unit 120 to assign the relevant task based on the location or state of the selected mobile drive unit 120, an indication that the selected mobile drive unit 120 has completed a previously-assigned task, a predetermined schedule, and/or any other suitable consideration. These destinations may be associated with an inventory request the management module 115 is executing or a management objective the management module 115 is attempting to fulfill. For example, the task assignment may define the location of an inventory holder 130 to be retrieved, an inventory station 150 to be visited, a storage location where the mobile drive unit 120 should park until receiving another task, or a location associated with any other task appropriate based on the configuration, characteristics, and/or state of inventory system 110, as a whole, or individual components of inventory system 110. For example, in particular embodiments, such decisions may be based on the popularity of particular inventory items, the staffing of a particular inventory station 150, the tasks currently assigned to a particular mobile drive unit 120, and/or any other appropriate considerations.

As part of completing these tasks mobile drive units 120 may dock with and transport inventory holders 130 within workspace 170. Mobile drive units 120 may dock with inventory holders 130 by connecting to, lifting, and/or otherwise interacting with inventory holders 130 in any other suitable manner so that, when docked, mobile drive units 120 are coupled to and/or support inventory holders 130 and can move inventory holders 130 within workspace 170. While the description below focuses on particular embodiments of mobile drive unit 120 and inventory holder 130 that are configured to dock in a particular manner, alternative embodiments of mobile drive unit 120 and inventory holder 130 may be configured to dock in any manner suitable to allow mobile drive unit 120 to move inventory holder 130 within workspace 170. Additionally, as noted below, in particular embodiments, mobile drive units 120 represent all or portions of inventory holders 130. In such embodiments, mobile drive units 120 may not dock with inventory holders 130 before transporting inventory holders 130 and/or mobile drive units 120 may each remain continually docked with a particular inventory holder 130.

While the appropriate components of inventory system 110 complete assigned tasks, management module 115 may interact with the relevant components to ensure the efficient use of space, equipment, manpower, and other resources available to inventory system 110. As one specific example of such interaction, management module 115 is responsible, in particular embodiments, for planning the paths mobile drive units 120 take when moving within workspace 170 and for allocating use of a particular portion of workspace 170 to a particular mobile drive unit 120 for purposes of completing an assigned task. In such embodiments, mobile drive units 120 may, in response to being assigned a task, request a path to a particular destination associated with the task. Moreover, while the description below focuses on one or more embodiments in which mobile drive unit 120 requests paths from management module 115, mobile drive unit 120 may, in alternative embodiments, generate its own paths.

Components of inventory system 110 may provide information to management module 115 regarding their current state, other components of inventory system 110 with which they are interacting, and/or other conditions relevant to the operation of inventory system 110. This may allow management module 115 to utilize feedback from the relevant components to update algorithm parameters, adjust policies, or otherwise modify its decision-making to respond to changes in operating conditions or the occurrence of particular events.

In addition, while management module 115 may be configured to manage various aspects of the operation of the components of inventory system 110, in particular embodiments, the components themselves may also be responsible for decision-making relating to certain aspects of their operation, thereby reducing the processing load on management module 115.

Thus, based on its knowledge of the location, current state, and/or other characteristics of the various components of inventory system 110 and an awareness of all the tasks currently being completed, management module 115 can generate tasks, allot usage of system resources, and otherwise direct the completion of tasks by the individual components in a manner that optimizes operation from a system-wide perspective. Moreover, by relying on a combination of both centralized, system-wide management and localized, component-specific decision-making, particular embodiments of inventory system 110 may be able to support a number of techniques for efficiently executing various aspects of the operation of inventory system 110. As a result, particular embodiments of management module 115 may, by implementing one or more management techniques described below, enhance the efficiency of inventory system 110 and/or provide other operational benefits.

FIGS. 16 through 19 illustrate in greater detail the components of a particular embodiment of mobile drive unit 120. In particular, FIGS. 16 through 18 include a front and side view of an example mobile drive unit 120. Mobile drive unit 120 includes a docking head 210, a drive module 220, a docking actuator 230, and a control module 270. Additionally, mobile drive unit 120 may include one or more sensors configured to detect or determine the location of mobile drive unit 120, inventory holder 130, and/or other appropriate elements of inventory system 110. In the illustrated embodiment, mobile drive unit 120 includes a position sensor 240, a holder sensor 250, an obstacle sensor 260, and an identification signal transmitter 262.

Docking head 210, in particular embodiments of mobile drive unit 120, couples mobile drive unit 120 to inventory holder 130 and/or supports inventory holder 130 when mobile drive unit 120 is docked to inventory holder 130. Docking head 210 may additionally allow mobile drive unit 120 to maneuver inventory holder 130, such as by lifting inventory holder 130, propelling inventory holder 130, rotating inventory holder 130, and/or moving inventory holder 130 in any other appropriate manner. Docking head 210 may also include any appropriate combination of components, such as ribs, spikes, and/or corrugations, to facilitate such manipulation of inventory holder 130. For example, in particular embodiments, docking head 210 may include a high-friction portion that abuts a portion of inventory holder 130 while mobile drive unit 120 is docked to inventory holder 130. In such embodiments, frictional forces created between the high-friction portion of docking head 210 and a surface of inventory holder 130 may induce translational and rotational movement in inventory holder 130 when docking head 210 moves and rotates, respectively. As a result, mobile drive unit 120 may be able to manipulate inventory holder 130 by moving or rotating docking head 210, either independently or as a part of the movement of mobile drive unit 120 as a whole.

Drive module 220 propels mobile drive unit 120 and, when mobile drive unit 120 and inventory holder 130 are docked, inventory holder 130. Drive module 220 may represent any appropriate collection of components operable to propel mobile drive unit 120. For example, in the illustrated embodiment, drive module 220 includes a pair of motorized wheels 224, and a pair of stabilizing wheels 226. One motorized wheel 224 is located on each side of the mobile drive unit 120, and one stabilizing wheel 226 is positioned at each end of mobile drive unit 120. Each of the motorized wheels 224 is driven via an associated drive unit 225 that includes an ECM 12 and associated integrated motor controller 10 as described herein.

Docking actuator 230 moves docking head 210 towards inventory holder 130 to facilitate docking of mobile drive unit 120 and inventory holder 130. Docking actuator 230 may also be capable of adjusting the position or orientation of docking head 210 in other suitable manners to facilitate docking. Docking actuator 230 may include any appropriate components, based on the configuration of mobile drive unit 120 and inventory holder 130, for moving docking head 210 or otherwise adjusting the position or orientation of docking head 210. For example, in the illustrated embodiment, docking actuator 230 includes a motorized shaft (not shown) attached to the center of docking head 210. The motorized shaft is operable to lift docking head 210 as appropriate for docking with inventory holder 130. In many embodiments, the docking actuator 230 includes an associated ECM 12 drivingly coupled with the motorized shaft and an integrated motor controller 10 as described herein.

Drive module 220 may be configured to propel mobile drive unit 120 in any appropriate manner. For example, in the illustrated embodiment, motorized wheels 224 are operable to rotate in a first direction to propel mobile drive unit 120 in a forward direction. Motorized wheels 224 are also operable to rotate in a second direction to propel mobile drive unit 120 in a backward direction. In the illustrated embodiment, drive module 220 is also configured to rotate mobile drive unit 120 by rotating motorized wheels 224 in different directions from one another or by rotating motorized wheels 224 at different speed from one another.

Position sensor 240 represents one or more sensors, detectors, or other components suitable for determining the location of mobile drive unit 120 in any appropriate manner. For example, in particular embodiments, the workspace 170 associated with inventory system 110 includes a number of fiducial marks that mark points on a two-dimensional grid that covers all or a portion of workspace 170. In such embodiments, position sensor 240 may include a camera and suitable image- and/or video-processing components, such as an appropriately-programmed digital signal processor, to allow position sensor 240 to detect fiducial marks within the camera's field of view. Control module 270 may store location information that position sensor 240 updates as position sensor 240 detects fiducial marks. As a result, position sensor 240 may utilize fiducial marks to maintain an accurate indication of the location mobile drive unit 120 and to aid in navigation when moving within workspace 170.

Holder sensor 250 represents one or more sensors, detectors, or other components suitable for detecting inventory holder 130 and/or determining, in any appropriate manner, the location of inventory holder 130, as an absolute location or as a position relative to mobile drive unit 120. Holder sensor 250 may be capable of detecting the location of a particular portion of inventory holder 130 or inventory holder 130 as a whole. Mobile drive unit 120 may then use the detected information for docking with or otherwise interacting with inventory holder 130.

Obstacle sensor 260 represents one or more sensors capable of detecting objects located in one or more different directions in which mobile drive unit 120 is capable of moving. Obstacle sensor 260 may utilize any appropriate components and techniques, including optical, radar, sonar, pressure-sensing and/or other types of detection devices appropriate to detect objects located in the direction of travel of mobile drive unit 120. In particular embodiments, obstacle sensor 260 may transmit information describing objects it detects to control module 270 to be used by control module 270 to identify obstacles and to take appropriate remedial actions to prevent mobile drive unit 120 from colliding with obstacles and/or other objects.

Obstacle sensor 260 may also detect signals transmitted by other mobile drive units 120 operating in the vicinity of the illustrated mobile drive unit 120. For example, in particular embodiments of inventory system 110, one or more mobile drive units 120 may include an identification signal transmitter 262 that transmits a drive identification signal. The drive identification signal indicates to other mobile drive units 120 that the object transmitting the drive identification signal is in fact a mobile drive unit. Identification signal transmitter 262 may be capable of transmitting infrared, ultraviolet, audio, visible light, radio, and/or other suitable signals that indicate to recipients that the transmitting device is a mobile drive unit 120.

Additionally, in particular embodiments, obstacle sensor 260 may also be capable of detecting state information transmitted by other mobile drive units 120. For example, in particular embodiments, identification signal transmitter 262 may be capable of including state information relating to mobile drive unit 120 in the transmitted identification signal. This state information may include, but is not limited to, the position, velocity, direction, and the braking capabilities of the transmitting mobile drive unit 120. In particular embodiments, mobile drive unit 120 may use the state information transmitted by other mobile drive units to avoid collisions when operating in close proximity with those other mobile drive units.

Control module 270 monitors and/or controls operation of drive module 220 and docking actuator 230. Control module 270 may also receive information from sensors such as position sensor 240 and holder sensor 250 and adjust the operation of drive module 220, docking actuator 230, and/or other components of mobile drive unit 120 based on this information. Additionally, in particular embodiments, mobile drive unit 120 may be configured to communicate with a management device of inventory system 110 and control module 270 may receive commands transmitted to mobile drive unit 120 and communicate information back to the management device utilizing appropriate communication components of mobile drive unit 120. Control module 270 may include any appropriate hardware and/or software suitable to provide the described functionality. In particular embodiments, control module 270 includes a general-purpose microprocessor programmed to provide the described functionality. Additionally, control module 270 may include all or portions of docking actuator 230, drive module 220, position sensor 240, and/or holder sensor 250, and/or share components with any of these elements of mobile drive unit 120.

Moreover, in particular embodiments, control module 270 may include hardware and software located in components that are physically distinct from the device that houses drive module 220, docking actuator 230, and/or the other components of mobile drive unit 120 described above. For example, in particular embodiments, each mobile drive unit 120 operating in inventory system 110 may be associated with a software process (referred to here as a "drive agent") operating on a server that is in communication with the device that houses drive module 220, docking actuator 230, and other appropriate components of mobile drive unit 120. This drive agent may be responsible for requesting and receiving tasks, requesting and receiving routes, transmitting state information associated with mobile drive unit 120, and/or otherwise interacting with management module 115 and other components of inventory system 110 on behalf of the device that physically houses drive module 220, docking actuator 230, and the other appropriate components of mobile drive unit 120. As a result, for the purposes of this description and the claims that follow, the term "mobile drive unit" includes software and/or hardware, such as agent processes, that provides the described functionality on behalf of mobile drive unit 120 but that may be located in physically distinct devices from the drive module 220, docking actuator 230, and/or the other components of mobile drive unit 120 described above.

Figure 16:
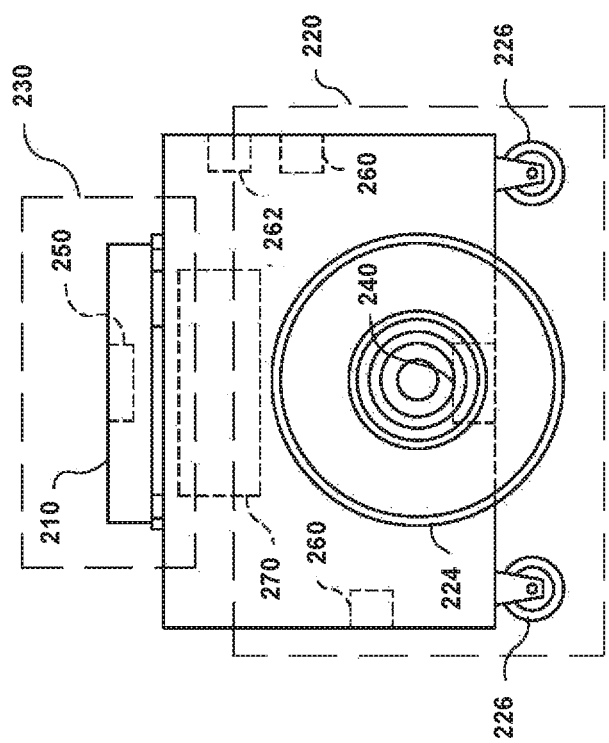
FIGS. 16-19 illustrate components of an example mobile drive unit that includes a plurality of the motor controllers of FIG. 1 and may be utilized in particular embodiments of the inventory system shown in FIG. 15.
Figure 17:
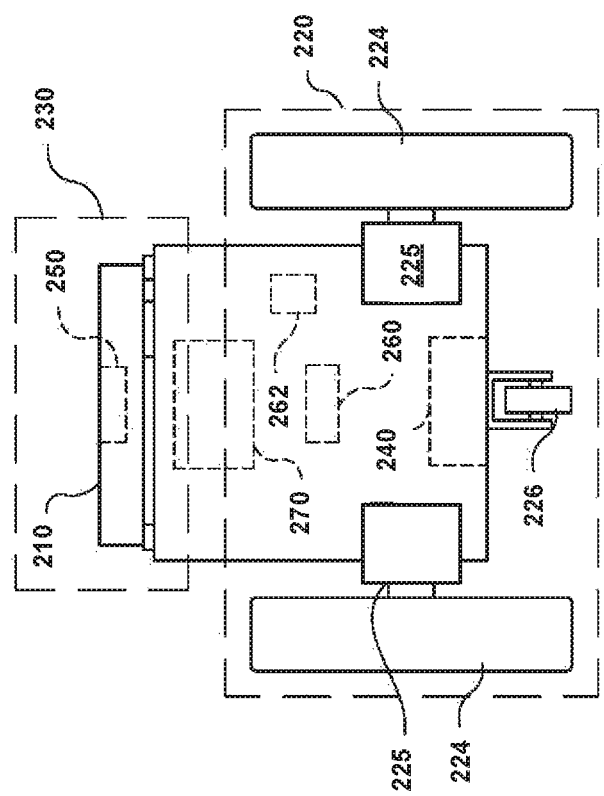
Figure 18:
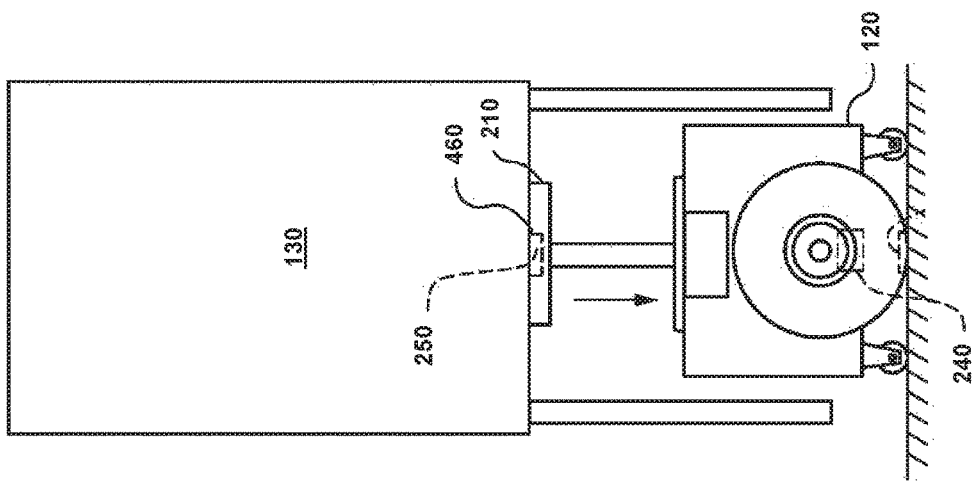

While FIGS. 16 through 18 illustrate a particular embodiment of mobile drive unit 120 containing certain components and configured to operate in a particular manner, mobile drive unit 120 may represent any appropriate component and/or collection of components configured to transport and/or facilitate the transport of inventory holders 30. As another example, mobile drive unit 120 may represent part of an overhead crane system in which one or more crane assemblies are capable of moving within a network of wires or rails to a position suitable to dock with a particular inventory holder 130. After docking with inventory holder 130, the crane assembly may then lift inventory holder 130 and move inventory to another location for purposes of completing an assigned task.

Figure 19:
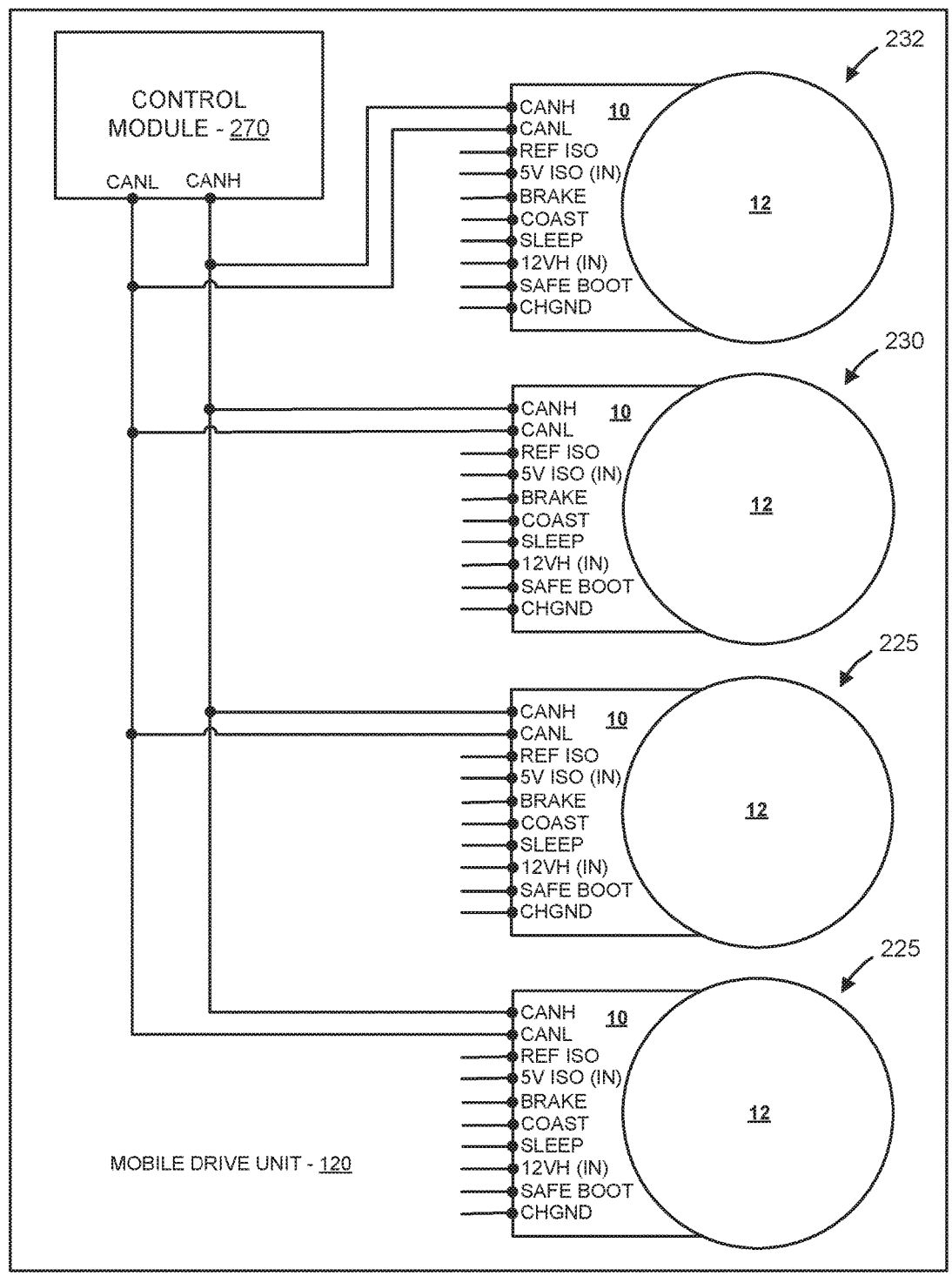

FIG. 19 illustrates components of an example mobile drive unit 120 that includes a plurality of the motor controllers 10 integrated with respective ECMs 12. In the illustrated embodiment, the mobile drive unit 120 includes two drive units 225, one for each of the motorized drive wheels 224, a lifting actuator 230, and a rotation actuator 232. Each of the two drive units 225, the lifting actuator 230 and the rotation actuator 232 include an ECM 12 and associated integrated motor controller 10 as described herein. Each of the motor controllers 10 is communicatively coupled with the control module 270 via a CANBUS. Although not explicitly shown, each of the other input connections to each of the motor controllers 10 can be suitably coupled with the control module 270 to receive corresponding control signals from the control module 270. As described herein, there can be more than one type of ECM 12 employed in the mobile drive unit 120 and the control unit 18 can be configured (e.g., via programming of a ECM motor type data bit in the control unit 18) to control the respective ECM 12 in accordance with the type of rotor position signals generated by the respective ECM 12 and interface with the control module 270 via the CANBUS using a common command protocol regardless of the type of ECMs employed.

CAN Interface Protocol

The motor controller 10 is configured to permit updates to the CAN interface protocol used to provide motor control commands to the motor controller 10. To enable identification of the current CAN interface protocol version installed on the motor controller 10, the motor controller 10 is configured to respond to a protocol identification request command by transmitting protocol version information corresponding to the current installed CAN interface protocol.

The motor controller 10 is configured to accept motor control commands via the CANBUS. A drive motor command sets new Id and Iq current set points by which the motor controller 10 operates the ECM 12. A disable motor command results in the motor controller 10 placing the ECM 12 in a free-wheel mode. A run diagnostics command results in the motor controller 10 performing a diagnostic sequence in which the FETs of the switching assembly 16 are operated in a diagnostic sequence to assess functionality of the motor controller 10 with particular focus on the functionality of the switching assembly 16 and certain aspects of the ECM 12. For example, with the FETs 42 connected to both of Phase B and Phase C open, Phase A is connected to Vbus and the voltage of each of the Phases is checked to see if all Phases have the Vbus voltage (no fault) or if any of the Phases cannot be pulled high (fault). In a similar manner, Phase A can be connected to ground and the voltage of each of the Phases is checked to see if all Phases have the ground voltage (no fault) or if any of the Phases cannot be pulled low (fault). Potential fault messages that can be generated by the diagnostic sequence include Phase A cannot be pulled low, Phase A cannot be pulled high, Phase A stuck low, Phase A cannot be disabled, Phase B cannot be pulled low, Phase B cannot be pulled high, Phase B stuck low, Phase B cannot be disabled, Phase C cannot be pulled low, Phase C cannot be pulled high, Phase C stuck low, Phase C cannot be disabled, and general failure. General failure means that the diagnostic was unable to be performed for any reason. One possible reason is that the three phases are not connected together through the motor winding, which is detected when one or more phases fail to follow the actively-driven phase.

The motor controller 10 can be configured to communicate additional faults via the CANBUS. These additional faults can include an over-voltage fault (e.g., 10 ms filtered battery voltage measurement exceeded 60 Volts), an under-voltage fault (e.g., 10 ms filtered battery voltage measurement fell below 20 Volts), an over-temperature fault (e.g., FET/printed circuit board over-temperature sensor indicated more than 100 degrees Celsius), a motor thermal switch open fault (e.g., the motor controller 10 detected a loss in continuity in the motor thermal switch loop), a current control fault (e.g., the 100 ms filtered RMS current tracking error exceeded 10 A, which can indicate that the current feedback control is unstable), an over-speed fault (e.g., the motor rotor speed, determined by the rotor angle estimator, exceeded a preset maximum rotor speed), a general fault (e.g., any other internal fault), and a parameters invalid fault (e.g., not programmed since the last reboot or invalid values).

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A motor controller configured to control any designated one of at least three different types of electronically commutated motors (ECMs), the motor controller comprising:
   a controller area network (CAN) connection;
   a switching assembly configured to control current flow through a phase A stator coil of an ECM, a phase B stator coil of the ECM, and a phase C stator coil of the ECM;
   a phase B current sensor configured to measure current flowing through the phase B stator coil;
   a phase C current sensor configured to measure current flowing through the phase C stator coil;
   rotor orientation signal inputs including:
      one or more Hall sensor inputs configured to receive output generated by Hall sensors responsive to the ECM including the one or more Hall sensors configured to sense orientation of a rotor of the ECM; and
      one or more encoder inputs configured to receive output generated by one or more encoders responsive to the ECM including the one or more encoders configured to sense orientation of the rotor; and
   a control unit operatively coupled with the CAN connection, the rotor orientation signal inputs, the phase B current sensor, the phase C current sensor, and the switching assembly, the control unit being configured to:
      receive D and Q axis current commands via the CAN connection;
      receive data designating one of at least three different types of ECMs via the CAN connection and store the designated ECM type in memory, the at least three different types of ECMs including a) an ECM that includes one or more Hall sensors configured to sense rotor orientation, b) an ECM that includes one or more encoders configured to sense rotor orientation, and c) an ECM that does not include any sensors configured to sense rotor orientation; and
      control the switching assembly to operate the ECM in accordance with the D and Q axis current commands using rotor orientation estimated based on at least one of a) the output generated by the one or more Hall sensors, b) the output generated by the one or more encoders, or c) outputs from the phase B current sensor and the phase C current sensor.

2. The motor controller of claim 1, further comprising at least one of:
   a brake input operatively connected to the control unit and independent of the CAN connection, the control unit being configured to control the switching assembly to operate the ECM in a braking mode that resists rotation of the rotor in response to a brake signal received via the brake input;
   a sleep input operatively connected to the control unit and independent of the CAN connection, the control unit being configured to enter a sleep mode in which the motor controller has an input current of less than 5 milliamps in response to a sleep signal received via the sleep input;
a coast input operatively connected to the control unit and independent of the CAN connection, the control unit being configured to control the switching assembly to operate the ECM in a coasting mode that enables free rotation of the rotor in response to a coast signal received via the coast input; or
a safe boot input operatively connected to the control unit and independent of the CAN connection, the control unit being configured to control the switching assembly to not operate the ECM in response to a safe boot signal received via the safe boot input.

3. The motor controller of claim 1, wherein the control unit is configured to receive commands via the CAN connection and output responses via the CAN connection that are invariant of the designated ECM type.

4. The motor controller of claim 1, wherein the control unit is configured to control the switching assembly to employ field weakening for limited motor drive when line to line back electromotive force (EMF) exceeds a battery voltage used to drive the ECM.

5. A motor controller configured to control any designated one of a plurality of different types of electronically commutated motors (ECMs), the motor controller comprising:
an operational command connection;
a switching assembly configured to control current flow through a phase A stator coil of an ECM, a phase B stator coil of the ECM, and a phase C stator coil of the ECM;
rotor orientation signal inputs; and
a control unit operatively coupled with the operational command connection, the rotor orientation signal inputs, and the switching assembly, the control unit being configured to:
receive motor operation commands via the operational command connection;
receive data designating one of a plurality of different types of ECMs, the plurality of different types of ECMs including at least two of a) an ECM that includes one or more Hall sensors configured to generate output indicative of rotor orientation, b) an ECM that includes one or more encoders configured to generate output indicative of rotor orientation, and c) an ECM that does not include any sensors configured to generate output indicative of rotor orientation; and
control the switching assembly to operate the ECM in accordance with the motor operation commands using rotor orientation estimated based on at least two of a) the output generated by the one or more Hall sensors responsive to the designated ECM type including the one or more Hall sensors, b) the output generated by one or more encoders responsive to the designated ECM type including the one or more encoders, or c) outputs from a phase B current sensor and a phase C current sensor responsive to the designated ECM type not including any sensors.

6. The motor controller of claim 5, wherein the control unit is configured to estimate initial rotor orientation by measuring inductance of the ECM and selecting an initial rotor orientation based on the measured ECM inductance.

7. The motor controller of claim 5, wherein:
the operational command connection comprises a controller area network (CAN) connection; and
the control unit is configured to receive commands via the CAN connection and output responses via the CAN connection that are invariant of the designated ECM type.

8. The motor controller of claim 5, wherein the control unit is configured to control the switching assembly to operate the ECM in a braking mode that resists rotation of the rotor in response to a brake signal received via a brake signal input.

9. The motor controller of claim 5, wherein the control unit is configured to enter a sleep mode in which the motor controller has an input current of less than 5 milliamps in response to a sleep signal received via a sleep input.

10. The motor controller of claim 5, wherein the control unit is configured to control the switching assembly to operate the ECM in a coasting mode that enables free rotation of the rotor in response to a coast signal received via a coast signal input.

11. The motor controller of claim 5, wherein the control unit is configured to load a recovery-mode firm-ware image from memory in response to a safe boot signal received via a safe boot input.

12. The motor controller of claim 5, wherein the control unit is configured to control the switching assembly to employ field weakening for limited motor drive when line to line back electromotive force (EMF) exceeds a battery voltage used to drive the ECM.

13. The motor controller of claim 5, further comprising the phase B current sensor configured to measure current flowing through the phase B stator coil and the phase C current sensor configured to measure current flowing through the phase C stator coil, and wherein the control unit is configured to estimate rotor orientation based on the outputs from the phase B current sensor and the phase C current sensor responsive to the designated ECM type not including any sensors configured to generate output indicative of rotor orientation.

14. The motor controller of claim 5, wherein the control unit is configured to monitor the operational command connection for periodic heartbeat signals and operate the ECM in a coasting mode that enables free rotation of the rotor in response to a non-occurrence of one or more of the periodic heartbeat signals.

15. An inventory management system, comprising:
an inventory holder configured to store inventory items;
a mobile drive unit configured to transport the inventory holder, the mobile drive unit comprising:
a drive wheel configured to propel the mobile drive unit;
a lifting platform configured to lift the inventory holder;
a lifting actuator connected to the lifting platform and operable to lift the lifting platform;
a rotation actuator operable to rotate the lifting platform;
a first integrated drive assembly comprising a first electronically commutated motor (ECM) and a first ECM controller operatively connected to the first ECM, the first ECM being drivingly coupled with the drive wheel, the first ECM controller being configured to control flow of current through stator coils of the first ECM in accordance with first D and Q axis current commands received by the first ECM controller;
a second integrated drive assembly comprising a second ECM and a second ECM controller operatively connected to the second ECM, the second ECM being drivingly coupled with the lifting platform, the second ECM controller being configured to control flow of current through stator coils of the second ECM in accordance with second D and Q axis current commands received by the second ECM controller;

a third integrated drive assembly comprising a third ECM and a third ECM controller operatively connected to the third ECM, the third ECM being drivingly coupled with the rotation actuator, the third ECM controller being configured to control flow of current through stator coils of the third ECM in accordance with third D and Q axis current commands received by the third ECM controller;

a controller area network (CAN) communicatively coupled with the first ECM controller, the second ECM controller, and the third ECM controller;

a control unit communicatively coupled with the CAN and configured to:
control operation of the first integrated drive assembly by at least transmitting the first D and Q axis current commands to the first ECM controller via the CAN;
control operation of the second integrated drive assembly by at least transmitting the second D and Q axis current commands to the second ECM controller via the CAN; and
control operation of the third integrated drive assembly by at least transmitting the third D and Q axis current commands to the third ECM controller via the CAN; and a management module configured to at least instruct the mobile drive unit to at least one of lift, move or rotate the inventory holder.

16. The inventory management system of claim 15, wherein each of the first, second, and third ECM controllers have the same configuration and are programmable to designate one of a plurality of different types of ECMs to be controlled by the respective ECM controller, the plurality of different types of ECMs including at least two of a) an ECM that includes one or more Hall sensors configured to generate output indicative of rotor orientation, b) an ECM that includes one or more encoders configured to generate output indicative of rotor orientation, and c) an ECM that does not include any sensors configured to generate output indicative of rotor orientation.

17. The inventory management system of claim 16, wherein the third ECM is a different type of the plurality of different types of ECMs than that of at least one of the first or second ECMs.

18. The inventory management system of claim 16, wherein:
each of the first, second, and third ECM controllers comprises a phase B current sensor configured to measure current flowing through a phase B stator coil of the respective ECM and a phase C current sensor configured to measure current flowing through the phase C stator coil of the respective ECM; and
each of the first, second, and third ECM controllers is configured to estimate rotor orientation based on outputs from the phase B current sensor and the phase C current sensor responsive to the designated ECM type not including any sensors.

19. The inventory management system of claim 15, wherein each of the first, second and third ECM controllers is configured to perform at least one of:
operate the respective ECM in a braking mode that resists rotation of the respective drive wheel in response to a brake signal received via a brake signal input;
enter a sleep mode having an input current of less than 5 milliamps in response to a sleep signal received via a sleep input;
operate the respective ECM in a coasting mode that enables free rotation of the respective drive wheel in response to a coast signal received via a coast signal input;
load a recovery-mode firm-ware image from memory in response to a safe boot signal received via a safe boot input; or
employ field weakening for limited motor drive when line to line back electromotive force (EMF) exceeds a battery voltage used to drive the respective ECM.

20. The inventory management system of claim 15, wherein each of the first, second and third ECM controllers is configured to monitor the CAN for periodic heartbeat signals and operate the respective ECM in a coasting mode that enables free rotation of the respective drive wheel in response to a non-occurrence of one or more of the periodic heartbeat signals.

* * * * *